(12) United States Patent
Peng et al.

(10) Patent No.: US 12,192,202 B2
(45) Date of Patent: Jan. 7, 2025

(54) COMMUNICATION METHOD, COMMUNICATIONS APPARATUS, AND COMMUNICATIONS SYSTEM

(71) Applicant: HUAWEI TECHNOLOGIES CO., LTD., Guangdong (CN)

(72) Inventors: Shuping Peng, Beijing (CN); Guoyi Chen, Beijing (CN); Chengguang Niu, Beijing (CN); Zhouyi Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 431 days.

(21) Appl. No.: 17/477,884

(22) Filed: Sep. 17, 2021

(65) Prior Publication Data
US 2022/0006810 A1    Jan. 6, 2022

Related U.S. Application Data

(63) Continuation of application No. PCT/CN2020/079971, filed on Mar. 18, 2020.

(30) Foreign Application Priority Data

Mar. 18, 2019   (CN) .......................... 201910205524.7

(51) Int. Cl.
*H04L 9/40*      (2022.01)
*H04L 12/66*     (2006.01)
(Continued)

(52) U.S. Cl.
CPC .......... *H04L 63/0892* (2013.01); *H04L 12/66* (2013.01); *H04L 47/825* (2013.01); *H04L 61/503* (2022.05); *H04L 67/141* (2013.01)

(58) Field of Classification Search
CPC ... H04L 63/0892; H04L 12/66; H04L 47/825; H04L 61/503; H04L 67/141;
(Continued)

(56) References Cited

U.S. PATENT DOCUMENTS

2015/0350912 A1* 12/2015 Head ...................... H04L 63/08
                                                                726/4
2018/0176777 A1*  6/2018 Chen .................... H04W 12/06
(Continued)

FOREIGN PATENT DOCUMENTS

CN      101404798 A     4/2009
CN      101494638 A     7/2009
(Continued)

OTHER PUBLICATIONS

3GPP TSG SA WG2, Status of work on 5G WWC, LIAISE-69, Aug. 10, 2017, 2 pages.
Michael Fargano:"LIAISE-69", (Aug. 12, 2017), total 2 pages.

*Primary Examiner* — Mohammad W Reza
(74) *Attorney, Agent, or Firm* — WOMBLE BOND DICKINSON (US) LLP

(57) ABSTRACT

This application discloses a communication method, and relates to the communications field. In the method, a fixed mobile interworking function (FMIF) receives an access request message that carries first authentication information of a fixed network device and that is sent by a broadband network gateway (BNG), where the first authentication information is generated by the BNG based on a dial-up packet sent by the fixed network device, and the first authentication information includes an identifier of the fixed network device. The FMIF encapsulates the first authentication message in a message format supported by a control plane interface between the FMIF and a core network device, to obtain a second authentication message; and the FMIF sends the second authentication message to the core network device through the control plane interface. The core network device performs authentication on the fixed network device based on the second authentication message.

20 Claims, 12 Drawing Sheets

(51) Int. Cl.
 *H04L 47/70* (2022.01)
 *H04L 61/503* (2022.01)
 *H04L 67/141* (2022.01)

(58) Field of Classification Search
 CPC ... H04L 63/0876; H04L 67/146; H04L 69/22;
    H04L 12/4633; H04L 12/4641; H04L
    67/104; H04L 2212/00; H04W 12/06;
     H04W 28/065
 See application file for complete search history.

(56) References Cited

U.S. PATENT DOCUMENTS

2018/0375863 A1\* 12/2018 Fan .................. G06F 21/31
2022/0167167 A1\* 5/2022 Jost ................. H04W 12/06

FOREIGN PATENT DOCUMENTS

| CN | 102740401 A | 10/2012 |
|---|---|---|
| CN | 103313344 A | 9/2013 |
| CN | 103428800 A | 12/2013 |
| CN | 104185303 A | 12/2014 |
| CN | 108738013 A | 11/2018 |
| CN | 108934022 A | 12/2018 |
| WO | 2019047197 A1 | 3/2019 |

\* cited by examiner

COMMUNICATION METHOD, COMMUNICATIONS APPARATUS, AND COMMUNICATIONS SYSTEM

CROSS-REFERENCE TO RELATED APPLICATIONS

This application is a continuation of international Application No. PCT/CN2020/079971, filed on Mar. 18, 2020, which claims priority to Chinese Patent Application No. 201910205524.7, filed on Mar. 18, 2019. The disclosures of the aforementioned applications are hereby incorporated by reference in their entireties.

TECHNICAL FIELD

This application relates to the communications field, and in particular, to a communication method, a communications apparatus, and a communications system.

BACKGROUND

Communications networks are classified into a mobile network and a fixed network. A mobile subscriber is allowed to access the mobile network and can send or receive data in the mobile network. A fixed-network subscriber is allowed to access the fixed network and can send or receive data in the fixed network. In a 4G communications network, a fixed-network subscriber is allowed to access a mobile network, to facilitate management of mobile subscribers and fixed-network subscribers.

When the fixed-network subscriber is to access the mobile network, authentication needs to be performed on the fixed-network subscriber in a core network of the mobile network, and the fixed-network subscriber can send or receive data in the mobile network only after the authentication succeeds. However, in a communications network that emerges after the 4G communications network, authentication cannot be performed on a fixed-network subscriber in a core network. For example, in a 5G communications network that emerges after the 4G communications network, authentication cannot be performed on a fixed-network subscriber in a 5G core network.

SUMMARY

To perform authentication on a fixed network device in a 5G core network or a core network later than a 5G core network, embodiments of this application provide a communication method and a communications apparatus. The technical solutions are as follows.

According to a first aspect, this application provides a communication method. In the method, a broadband network gateway (BNG) receives a dial-up packet sent by a fixed network device, and generates first authentication information of the fixed network device based on the dial-up packet, where the first authentication information includes an identifier of the fixed network device. The BNG sends an access request message to a fixed mobile interworking function (FMIF), where the access request message carries the first authentication information, and the access request message is used by the FMIF to request a core network device to perform authentication on the fixed network device based on the first authentication information. A communications network to which the core network device belongs is a 5G communications network or a communications network later than a 5G communications network. The BNG sends the authentication information of the fixed network device to the core network device through the FMIF, so that the core network device can perform authentication on the fixed network device. In this way, authentication can be performed on the fixed network device in a 5G core network or a core network later than a 5G core network.

In an embodiment, the access request message is a remote authentication dial-in user service Radius protocol access request message or a Diameter protocol access request message. In this way, the BNG may send the authentication information of the fixed network device to the FMIF by using the Radius protocol access request message or the Diameter protocol access request message, so that the FMIF sends the authentication information of the fixed network device to a core network device in the 5G core network or the core network later than the 5G core network.

In an embodiment, the BNG receives an address of the fixed network device that is sent by the core network device through the FMIF, where the address of the fixed network device is assigned by the core network device after the core network device receives a session establishment request message carrying the identifier of the fixed network device. The session establishment request message is sent by the FMIF after the authentication performed by the core network device on the fixed network device succeeds. The BNG establishes, based on the address of the fixed network device and an address of the FMIF, a data plane connection that is between the BNG and the FMIF and that corresponds to the fixed network device. Because the BNG receives the address of the fixed network device, the BNG may establish the data plane connection that is between the BNG and the FMIF and that corresponds to the fixed network device. In this way, a service packet of the fixed network device can be transmitted through the data plane connection.

According to a second aspect, this application provides a communication method. In the method, a fixed mobile interworking function (FMIF) receives an access request message sent by a broadband network gateway (BNG), where the access request message includes first authentication information of a fixed network device, the first authentication information is generated by the BNG based on a dial-up packet sent by the fixed network device, and the first authentication information includes an identifier of the fixed network device. The FMIF encapsulates the first authentication information in a message format supported by a control plane interface, to obtain second authentication information; and sends the second authentication information to the core network device through the control plane interface. The second authentication information is used by the core network device to perform authentication on the fixed network device. The control plane interface is an interface that is in the FMIF and that is used to communicate with the core network device. A communications network to which the core network device belongs is a 5G communications network or a communications network later than a 5G communications network. The FMIF encapsulates the first authentication information in the message format supported by the control plane interface, to obtain the second authentication information. In this way, the second authentication information can be sent to a core network device in a 5G core network or a core network later than a 5G core network through the control plane interface. This ensures that the core network device successfully performs authentication on the fixed network device.

In an embodiment, the control plane interface includes an N1 interface or an N2 interface, and the second authentication information is a subscription concealed identifier (SUCI), a subscription permanent identifier (SUPI), or a 5G globally unique temporary UE identity (5G-GUTI).

In an embodiment, the FMIF receives an acknowledgment message sent by the core network device after the authentication succeeds; sends a session establishment request message to the core network device, where the session establishment request message carries the identifier of the fixed network device, the session establishment request message is used by the core network device to allocate session information, the session information includes an address of the fixed network device, a tunnel endpoint identifier (TEID) of a tunnel on the side of the core network device, and a tunnel parameter of the tunnel, and the tunnel is a tunnel that is between the FMIF and the core network device and that corresponds to the fixed network device; receives the session information sent by the core network device; and establishes, based on the session information, a data plane connection that is between the FMIF and the BNG and that corresponds to the fixed network device, and establishes the tunnel based on the session information. The FMIF receives the session information, establishes, based on the session information, a data plan connection that is between the FMIF and the BNG that corresponds to the fixed network device, and establishes, based on the session information, the tunnel that is between the FMIF and the core network device and that corresponds to the fixed network device, that is, establishment of a data plane connection between the fixed network device and the core network device is completed. In this way, the fixed network device can use the data plane connection to transmit a service packet.

In an embodiment, the FMIF sends the address of the fixed network device to the BNG, and stores a correspondence between the address of the fixed network device and an address of the BNG into a first relationship table, where the first relationship table is used by the FMIF to transmit a downlink service packet of the fixed network device; and stores a correspondence between the address of the fixed network device, a TEID of the tunnel on the side of the FMIF, and the TEID of the tunnel on the side of the core network device into a second relationship table, where the second relationship table is used by the FMIF to send an uplink service packet of the fixed network device In this way, the FMIF can forward the service packet of the fixed network device by using the first relationship table and the second relationship table.

In an embodiment, the session information further includes the TEID of the tunnel on the side of the FMIF.

In an embodiment, the FMIF allocates the TEID of the tunnel on the side of the FMIF, and sends the TEID of the tunnel on the side of the FMIF to the core network device, where the TEID of the tunnel on the side of the FMIF is used to trigger the core network device to store the correspondence between the address of the fixed network device, the TEID of the tunnel on the side of the FMIF, and the TEID of the tunnel on the side of the core network device into a correspondence table, and the correspondence table is used by the core network device to transmit the downlink service packet of the fixed network device.

In an embodiment, the FMIF sends the session establishment request message to the core network device through the control plane interface, where the control plane interface includes the N1 interface or the N2 interface.

According to a third aspect, this application provides a communication method. In the method, a core network device receives a session establishment request message from a fixed mobile interworking function (FMIF), where the session establishment request message includes an identifier of a fixed network device, and a communications network to which the core network device belongs is a 5G communications network or a communications network later than a 5G communications network. The core network device allocates session information to the fixed network device based on the identifier of the fixed network device, where the session information includes an address of the fixed network device, a tunnel endpoint identifier (TEID) of a tunnel on the side of the core network device, and a tunnel parameter of the tunnel, and the tunnel is a tunnel that is between the FMIF and the core network device and that corresponds to the fixed network device. The core network device sends the session information to the FMIF, where the session information is used by the FMIF to establish a data plane connection between the fixed network device and the core network device. The core network device allocates the session information, and sends the session information to the FMIF. Therefore, the FMIF can establish, based on the session information, a data plan connection that is between the FMIF and a BNG and that corresponds to the fixed network device, and establish the tunnel that is between the FMIF and the core network device and that corresponds to the fixed network device, that is, establishment of a data plane connection between the fixed network device and the core network device is completed. In this way, the fixed network device can use the data plane connection to transmit a service packet.

In an embodiment, the core network device receives the second authentication information sent by the FMIF, where the second authentication information is obtained by the FMIF by encapsulating first authentication information in a message format supported by a control plane interface, the control plane interface is an interface that is in the FMIF and that is used to communicate with the core network device, and the first authentication information includes the identifier of the fixed network device; and performs authentication on the fixed network device based on the second authentication information. The FMIF encapsulates the first authentication information in the message format supported by the control plane interface, to obtain the second authentication information. In this way, the second authentication information can be sent to a core network device in a 5G core network or a core network later than a 5G core network through the control plane interface. This ensures that the core network device can successfully perform authentication on the fixed network device.

In an embodiment, the session information further includes a TEID of the tunnel on the side of the FMIF.

In an embodiment, the core network device receives a TEID of the tunnel on the side of the FMIF that is sent by the FMIF, where the TEID of the tunnel on the side of the FMIF is sent by using the session establishment request message, or is sent after the FMIF receives the session information.

In an embodiment, the core network device stores a correspondence between the address of the fixed network device, the TEID of the tunnel on the side of the FMIF, and the TEID of the tunnel on the side of the core network device into a correspondence table, where the correspondence table is used by the core network device to transmit a downlink service packet of the fixed network device. In this way, the downlink service packet can be sent to the fixed network device by using the correspondence table.

According to a fourth aspect, an embodiment of this application provides a communication method. In the method, a fixed mobile interworking function FMIF receives a first uplink service packet from the fixed network device; and encapsulates the first uplink service packet in an encapsulation manner corresponding to a tunnel, to obtain a second uplink service packet, where the tunnel is a tunnel that is between the FMIF and a core network device and that corresponds to the fixed network device, and a communications network to which the core network device belongs is a 5G communications network or a communications network later than a 5G communications network. The FMIF sends the second uplink service packet to the core network device through the tunnel. The FMIF encapsulates the first uplink service packet in the encapsulation manner corresponding to the tunnel, to obtain the second uplink service packet. Therefore, the second uplink service packet can be sent to the core network device through the tunnel. In this way, the fixed network device can send the uplink service packet to a 5G core network or a core network later than a 5G core network.

In an embodiment, the first uplink service packet includes an address of the fixed network device. The FMIF obtains a tunnel endpoint identifier (TEID) of the tunnel on the side of the FMIF and a TEID of the tunnel on the side of the core network device from a second relationship table based on the address of the fixed network device, where the second relationship table is used to store a correspondence between the address of the fixed network device, the TEID on the side of the FMIF, and the TEID on the side of the core network device; and adds, in the encapsulation manner corresponding to the tunnel, a packet header corresponding to the tunnel to the first uplink service packet, to obtain the second uplink service packet, where the packet header includes the obtained TEID on the side of the FMIF and the obtained TEID on the side of the core network device. In this way, the first uplink service packet is encapsulated.

In an embodiment, the FMIF detects, based on a preset field in the packet header of the first uplink service packet, whether the first uplink service packet is a packet of a mobile network service; and if the first uplink service packet is the packet of the mobile network service, performs the operation of encapsulating the first uplink service packet in an encapsulation manner corresponding to a tunnel, to obtain a second uplink service packet. In this way, it can be ensured that only a service packet of a mobile network service is sent to the core network device.

In an embodiment, the FMIF receives a first downlink service packet sent by the core network device to the fixed network device; decapsulates the first downlink service packet in a decapsulation manner corresponding to the tunnel, to obtain a second downlink service packet; and sends the second downlink service packet to the fixed network device through a data plane connection that is between the FMIF and the BNG and that corresponds to the fixed network device.

In an embodiment, the FMIF removes, in the decapsulation manner corresponding to the tunnel, the packet header corresponding to the tunnel from the first downlink service packet, to obtain the second downlink service packet.

In an embodiment, the tunnel is a general packet radio service tunneling protocol-user plane GTP-U tunnel.

According to a fifth aspect, an embodiment of this application provides a communication method. In the method, a core network device receives a second uplink service packet from a fixed mobile interworking function (FMIF), where the second uplink service packet is obtained by the FMIF by encapsulating a first uplink service packet from the fixed network device in an encapsulation manner corresponding to a tunnel, the tunnel is a tunnel that is between the FMIF and the core network device and that corresponds to the fixed network device, and a communications network to which the core network device belongs is a 5G communications network or a communications network later than a 5G communications network. The core network device decapsulates the second uplink service packet in a decapsulation manner corresponding to the tunnel, to obtain the first uplink service packet. The FMIF encapsulates the first uplink service packet in the encapsulation manner corresponding to the tunnel, to obtain the second uplink service packet. Therefore, the core network device can receive, through the tunnel, the second uplink service packet sent by the FMIF. In this way, the fixed network device can send the uplink service packet to a 5G core network or a core network later than a 5G core network.

In an embodiment, the core network device obtains a second downlink service packet to be sent to the fixed network device; encapsulates the second downlink service packet in the encapsulation manner corresponding to the tunnel, to obtain a first downlink service packet; and sends the first downlink service packet to the FMIF through the tunnel. In this way, the core network device can send the downlink service packet to the fixed network device.

In an embodiment, the second downlink service packet includes an address of the fixed network device. The core network device obtains a tunnel endpoint identifier (TEID) of the tunnel on the side of the FMIF and a TEID of the tunnel on the side of the core network device from a correspondence table based on the address of the fixed network device, where the correspondence table is used to store a correspondence between the address of the fixed network device, the TEID on the side of the FMIF, and the TEID on the side of the core network device; and adds, in the encapsulation manner corresponding to the tunnel, a packet header corresponding to the tunnel to the second downlink service packet, to obtain the first downlink service packet, where the packet header includes the obtained TEID on the side of the FMIF and the obtained TEID on the side of the core network device. In this way, the downlink service packet is encapsulated.

In an embodiment, the tunnel is a general packet radio service tunneling protocol-user plane GTP-U tunnel.

According to a sixth aspect, this application provides a communication method. In the method, an access gateway function (AGF) receives a dial-up packet sent by a fixed network device, and generates first authentication information of the fixed network device based on the dial-up packet, where the first authentication information includes an identifier of the fixed network device. The AGF encapsulates the first authentication information in a message format supported by a control plane interface, to obtain second authentication information, where the control plane interface is an interface that is in the AGF and that is used to communicate with a core network device, and a communications network to which the core network device belongs is a 5G communications network or a communications network later than a 5G communications network. The AGF sends the second authentication information to the core network device through the control plane interface, where the second authentication information is used by the core network device to perform authentication on the fixed network device. The AGF encapsulates the first authentication information in the message format supported by the control plane interface, to obtain the second authentication information. In this way, the second authentication information can be sent to a core network device in a 5G core network or a core network later than a 5G core network through the control plane interface. This ensures that the core network device successfully performs authentication on the fixed network device.

In an embodiment, the control plane interface includes an N1 interface or an N2 interface, and the second authentication information is a subscription concealed identifier (SUCI), a subscription permanent identifier (SUPI), or a 5G globally unique temporary UE identity (5G-GUTI).

In an embodiment, the AGF receives an acknowledgment message sent by the core network device after the authentication succeeds; and sends a session establishment request message to the core network device, where the session establishment request message carries the identifier of the fixed network device, the session establishment request message is used by the core network device to allocate session information, the session information includes an address of the fixed network device, a tunnel endpoint identifier (TEID) of a tunnel on the side of the core network device, and a tunnel parameter of the tunnel, and the tunnel is a tunnel that is between the AGF and the core network device and that corresponds to the fixed network device. The AGF receives the session information sent by the core network device, and establishes the tunnel based on the session information. The AGF receives the session information, and establishes, based on the session information, the tunnel that is between the AGF and the core network device and that corresponds to the fixed network device, that is, establishment of a data plane connection between the fixed network device and the core network device is completed. In this way, the fixed network device can use the data plane connection to transmit a service packet.

In an embodiment, the AGF stores a correspondence between the address of the fixed network device, a TEID of the tunnel on the side of the AGF, and the TEID of the tunnel on the side of the core network device into a second relationship table, where the second relationship table is used by the AGF to send an uplink service packet of the fixed network device. In this way, the AGF can forward the service packet of the fixed network device by using the second relationship table.

In an embodiment, the session information further includes the TEID of the tunnel on the side of the AGF.

In an embodiment, the AGF allocates the TEID of the tunnel on the side of the AGF, and sends the TEID of the tunnel on the side of the AGF to the core network device, where the TEID of the tunnel on the side of the AGF is stored by the core network device into a correspondence table, the correspondence table includes the correspondence between the address of the fixed network device, the TEID of the tunnel on the side of the AGF, and the TEID of the tunnel on the side of the core network device, and the correspondence table is used by the core network device to transmit a downlink service packet of the fixed network device.

In an embodiment, the AGF sends the session establishment request message to the core network device through the control plane interface, where the control plane interface includes the N1 interface or the N2 interface.

According to a seventh aspect, this application provides a communication method. In the method, an access gateway function AGF receives a first uplink service packet from the fixed network device; and encapsulates the first uplink service packet in an encapsulation manner corresponding to a tunnel, to obtain a second uplink service packet. The tunnel is a tunnel that is between the AGF and a core network device and that corresponds to the fixed network device, and a communications network to which the core network device belongs is a 5G communications network or a communications network later than a 5G communications network. The second uplink service packet is sent to the core network device through the tunnel. The AGF encapsulates the first uplink service packet in the encapsulation manner corresponding to the tunnel, to obtain the second uplink service packet. Therefore, the second uplink service packet can be sent to the core network device through the tunnel. In this way, the fixed network device can send the uplink service packet to a 5G core network or a core network later than a 5G core network.

In an embodiment, the first uplink service packet includes an address of the fixed network device. The AGF obtains a tunnel endpoint identifier (TEID) of the tunnel on the side of the AGF and a TEID of the tunnel on the side of the core network device from a second relationship table based on the address of the fixed network device. The second relationship table is used to store a correspondence between the address of the fixed network device, the TEID on the side of the AGF, and the TEID on the side of the core network device. The AGF adds, in the encapsulation manner corresponding to the tunnel, a packet header corresponding to the tunnel to the first uplink service packet, to obtain the second uplink service packet, where the packet header includes the obtained TEID on the side of the AGF and the obtained TEID on the side of the core network device. In this way, the first uplink service packet is encapsulated.

In an embodiment, the AGF detects, based on a preset field in the packet header of the first uplink service packet, whether the first uplink service packet is a packet of a mobile network service; and if the first uplink service packet is the packet of the mobile network service, performs the operation of encapsulating the first uplink service packet in an encapsulation manner corresponding to a tunnel, to obtain a second uplink service packet. In this way, it can be ensured that only a service packet of a mobile network service is sent to the core network device.

In an embodiment, the AGF receives a first downlink service packet sent by the core network device to the fixed network device; decapsulates the first downlink service packet in a decapsulation manner corresponding to the tunnel, to obtain a second downlink service packet; and sends the second downlink service packet to the fixed network device.

In an embodiment, the AGF removes, in the decapsulation manner corresponding to the tunnel, the packet header corresponding to the tunnel from the first downlink service packet, to obtain the second downlink service packet.

In an embodiment, the tunnel is a general packet radio service tunneling protocol-user plane GTP-U tunnel.

According to an eighth aspect, this application provides a core network device, including an access and mobility management function (AMF), a session management function (SMF), and a user plane function (UPF).

The AMF is configured to receive a session establishment request message from a fixed mobile interworking function (FMIF), where the session establishment request message includes an identifier of a fixed network device, and a communications network to which the core network device belongs is a 5G communications network or a communications network later than a 5G communications network. The AMF allocates session information to the fixed network device based on the identifier of the fixed network device, where the session information includes an address of the fixed network device, a tunnel endpoint identifier (TEID) of a tunnel on the side of the core network device, and a tunnel parameter of the tunnel, and the tunnel is a tunnel that is between the FMIF and the core network device and that corresponds to the fixed network device.

The AMF is further configured to: send the session information to the FMIF, and send the session information to the UPF through the SME The session information is used by the FMIF and the UPF to establish a data plane connection between the fixed network device and the core network device. The AMF allocates the session information, and sends the session information to the FMIF. Therefore, the FMIF can establish, based on the session information, a data plan connection that is between the FMIF and a BNG and that corresponds to the fixed network device, and establish the tunnel that is between the FMIF and the core network device and that corresponds to the fixed network device, that is, establishment of the data plane connection between the fixed network device and the core network device is completed. In this way, the fixed network device can use the data plane connection to transmit a service packet. It may be understood that, in this solution, an access gateway function (AGF) may be used to replace the BNG and the FMIF, that is, a function of the BNG and a function of the FMIF are integrated into the AGF. Except interaction between the FMIF and the BNG that is performed in the AGF, other processing processes are similar and are not described herein.

In an embodiment, the AMF is configured to receive the second authentication information sent by the FMIF, where the second authentication information is obtained by the FMIF by encapsulating first authentication information in a message format supported by a control plane interface, the control plane interface is an interface that is in the FMIF and that is used to communicate with the core network device, and the first authentication information includes the identifier of the fixed network device. The AMF performs authentication on the fixed network device based on the second authentication information. The FMIF encapsulates the first authentication information in the message format supported by the control plane interface, to obtain the second authentication information. In this way, the second authentication information can be sent to a core network device in a 5G core network or a core network later than a 5G core network through the control plane interface. This ensures that the core network device can successfully perform authentication on the fixed network device.

In an embodiment, the session information further includes a TEID of the tunnel on the side of the FMIF.

In an embodiment, the AMF receives a TEID of the tunnel on the side of the FMIF that is sent by the FMIF, and sends the TEID of the tunnel on the side of the FMIF to the UPF through the SMF, where the TEID of the tunnel on the side of the FMIF is sent by using the session establishment request message, or is sent after the FMIF receives the session information.

In an embodiment, the UPF is configured to store a correspondence between the address of the fixed network device, the TEID of the tunnel on the side of the FMIF, and the TEID of the tunnel on the side of the core network device into a correspondence table, where the correspondence table is used by the UPF to transmit a downlink service packet of the fixed network device. In this way, the downlink service packet can be sent to the fixed network device by using the correspondence table.

According to a ninth aspect, this application provides a core network device, including a core network control device and a user plane function (UPF), where the core network control device includes an access and mobility management function (AMF) and a session management function SMF.

The AMF is configured to receive a session establishment request message sent by a fixed mobile interworking function (FMIF), where the session establishment request message carries an identifier of a fixed network device, and a communications network to which the core network device belongs is a 5G communications network or a communications network later than a 5G communications network. The AMF allocates session information to the fixed network device based on the identifier of the fixed network device, where the session information includes an address of the fixed network device, a tunnel endpoint identifier (TEID) of a tunnel on the side of the core network device, and a tunnel parameter of the tunnel, and the tunnel is a tunnel that is between the FMIF and the core network device and that corresponds to the fixed network device.

The AMF is further configured to: send the session information to the FMIF, and send the session information to the UPF through the SMF, where the session information is used by the FMIF and the UPF to establish a data plane connection between the fixed network device and the core network device. The AMF allocates the session information, and sends the session information to the FMIF. Therefore, the FMIF can establish, based on the session information, a data plan connection that is between the FMIF and a BNG and that corresponds to the fixed network device, and establish the tunnel that is between the FMIF and the core network device and that corresponds to the fixed network device, that is, establishment of the data plane connection between the fixed network device and the core network device is completed. In this way, the fixed network device can use the data plane connection to transmit a service packet. It may be understood that, in this solution, an access gateway function (AGF) may be used to replace the BNG and the FMIF, that is, a function of the BNG and a function of the FMIF are integrated into the AGF. Except interaction between the FMIF and the BNG that is performed in the AGF, other processing processes are similar and are not described herein.

In an embodiment, the AMF is configured to receive the second authentication information sent by the FMIF, where the second authentication information is obtained by the FMIF by encapsulating first authentication information in a message format supported by a control plane interface, the control plane interface is an interface that is in the FMIF and that is used to communicate with the core network device, and the first authentication information includes the identifier of the fixed network device; and perform authentication on the fixed network device based on the second authentication information. The FMIF encapsulates the first authentication information in the message format supported by the control plane interface, to obtain the second authentication information. In this way, the second authentication information can be sent to a core network device in a 5G core network or a core network later than a 5G core network through the control plane interface. This ensures that the core network device can successfully perform authentication on the fixed network device.

In an embodiment, the session information further includes a TEID of the tunnel on the side of the FMIF.

In an embodiment, the AMF receives a TEID of the tunnel on the side of the FMIF that is sent by the FMIF.

The SMF is configured to send the TEID of the tunnel on the side of the FMIF to the UPF, where the TEID of the tunnel on the side of the FMIF is sent by using the session establishment request message, or is sent after the FMIF receives the session information.

According to a tenth aspect, an embodiment of this application provides a communications apparatus, where the apparatus includes a receiving unit, a processing unit, and a sending unit. The receiving unit is configured to receive a dial-up packet sent by a fixed network device; the processing unit is configured to generate first authentication information of the fixed network device based on the dial-up packet, where the first authentication information includes an identifier of the fixed network device; and the sending unit is configured to send an access request message to a fixed mobile interworking function (FMIF), where the access request message carries the first authentication information, the access request message is used by the FMIF to request a core network device to perform authentication on the fixed network device based on the first authentication information, and a communications network to which the core network device belongs is a 5G communications network or a communications network later than a 5G communications network. The sending unit sends the authentication information of the fixed network device to the core network device through the FMIF, so that the core network device can perform authentication on the fixed network device. In this way, authentication can be performed on the fixed network device in a 5G core network or a core network later than a 5G core network.

In an embodiment, the receiving unit, the processing unit, and the sending unit may be further configured to perform an operation of the method in any possible implementation of the first aspect. Details are not described herein again.

According to an eleventh aspect, an embodiment of this application provides a communications apparatus, where the apparatus includes a receiving unit, a processing unit, and a sending unit. The receiving unit is configured to receive an access request message sent by a broadband network gateway (BNG), where the access request message carries first authentication information of a fixed network device, the first authentication information is generated by the BNG based on a dial-up packet sent by the fixed network device, and the first authentication information includes an identifier of the fixed network device. The processing unit is configured to encapsulate the first authentication information in a message format supported by a control plane interface, to obtain second authentication information, where the control plane interface is an interface that is in the apparatus and that is used to communicate with a core network device, and a communications network to which the core network device belongs is a 5G communications network or a communications network later than a 5G communications network. The sending unit is configured to send the second authentication information to the core network device through the control plane interface, where the second authentication information is used by the core network device to perform authentication on the fixed network device. The processing unit encapsulates the first authentication information in the message format supported by the control plane interface, to obtain the second authentication information. In this way, the sending unit can send the second authentication information to a core network device in a 5G core network or a core network later than a 5G core network through the control plane interface. This ensures that the core network device successfully performs authentication on the fixed network device.

In an embodiment, the receiving unit, the processing unit, and the sending unit may be further configured to perform an operation of the method in any possible implementation of the second aspect. Details are not described herein again.

According to a twelfth aspect, an embodiment of this application provides a communications apparatus, where the apparatus includes a receiving unit, a processing unit, and a sending unit. The receiving unit is configured to receive a session establishment request message sent by a fixed mobile interworking function (FMIF), where the session establishment request message carries an identifier of a fixed network device, and a communications network to which the apparatus belongs is a 5G communications network or a communications network later than a 5G communications network. The processing unit is configured to allocate session information to the fixed network device based on the identifier of the fixed network device, where the session information includes an address of the fixed network device, a tunnel endpoint identifier (TEID) of a tunnel on the side of the apparatus, and a tunnel parameter of the tunnel, and the tunnel is a tunnel that is between the FMIF and the apparatus and that corresponds to the fixed network device. The sending unit is configured to send the session information to the FMIF, where the session information is used by the FMIF to establish a data plane connection between the fixed network device and the core network device. The processing unit allocates the session information, and the sending unit sends the session information to the FMIF. Therefore, the FMIF can establish, based on the session information, a data plan connection that is between the FMIF and a BNG and that corresponds to the fixed network device, and establish the tunnel that is between the FMIF and the core network device and that corresponds to the fixed network device, that is, establishment of the data plane connection between the fixed network device and the core network device is completed. In this way, the fixed network device can use the data plane connection to transmit a service packet.

In an embodiment, the receiving unit, the processing unit, and the sending unit may be further configured to perform an operation of the method in any possible implementation of the third aspect. Details are not described herein again.

According to a thirteenth aspect, an embodiment of this application provides a communications apparatus, where the apparatus includes a receiving unit, a processing unit, and a sending unit. The receiving unit is configured to receive a first uplink service packet from the fixed network device. The processing unit is configured to encapsulate the first uplink service packet in an encapsulation manner corresponding to a tunnel, to obtain a second uplink service packet, where the tunnel is a tunnel that is between the apparatus and a core network device and that corresponds to the fixed network device, and a communications network to which the core network device belongs is a 5G communications network or a communications network later than a 5G communications network. The sending unit is configured to send the second uplink service packet to the core network device through the tunnel. The processing unit encapsulates the first uplink service packet in the encapsulation manner corresponding to the tunnel, to obtain the second uplink service packet. Therefore, the sending unit can send the second uplink service packet to the core network device through the tunnel. In this way, the fixed network device can send the uplink service packet to a 5G core network or a core network later than a 5G core network.

In an embodiment, the receiving unit, the processing unit, and the sending unit may be further configured to perform an operation of the method in any possible implementation of the fourth aspect. Details are not described herein again.

According to a fourteenth aspect, an embodiment of this application provides a communications apparatus, where the apparatus includes a receiving unit and a processing unit.

The receiving unit is configured to receive a second uplink service packet from a fixed mobile interworking function FMIF, where the second uplink service packet is obtained by the FMIF by encapsulating a first uplink service packet from the fixed network device in an encapsulation manner corresponding to a tunnel, the tunnel is a tunnel that is between the FMIF and the apparatus and that corresponds to the fixed network device, and a communications network to which the apparatus belongs is a 5G communications network or a communications network later than a 5G communications network. The processing unit is configured to decapsulate the second uplink service packet in a decapsulation manner corresponding to the tunnel, to obtain the first uplink service packet. The FMIF encapsulates the first uplink service packet in the encapsulation manner corresponding to the tunnel, to obtain the second uplink service packet. Therefore, the receiving unit can receive, through the tunnel, the second uplink service packet sent by the FMIF. In this way, the fixed network device can send the uplink service packet to a 5G core network or a core network later than a 5G core network.

In an embodiment, the receiving unit and the processing unit may be further configured to perform an operation of the method in any possible implementation of the fifth aspect. Details are not described herein again.

According to a fifteenth aspect, an embodiment of this application provides a communications apparatus, where the apparatus includes a receiving unit, a processing unit, and a sending unit. The receiving unit is configured to receive a dial-up packet sent by a fixed network device. The processing unit is configured to generate first authentication information of the fixed network device based on the dial-up packet, where the first authentication information includes an identifier of the fixed network device. The processing unit is further configured to encapsulate the first authentication information in a message format supported by a control plane interface, to obtain second authentication information, where the control plane interface is an interface that is in the apparatus and that is used to communicate with a core network device, and a communications network to which the core network device belongs is a 5G communications network or a communications network later than a 5G communications network. The sending unit is configured to send the second authentication information to the core network device through the control plane interface, where the second authentication information is used by the core network device to perform authentication on the fixed network device. The processing unit encapsulates the first authentication information in the message format supported by the control plane interface, to obtain the second authentication information. In this way, the sending unit can send the second authentication information to a core network device in a 5G core network or a core network later than a 5G core network through the control plane interface. This ensures that the core network device successfully performs authentication on the fixed network device.

In an embodiment, the receiving unit, the processing unit, and the sending unit may be further configured to perform an operation of the method in any possible implementation of the sixth aspect. Details are not described herein again.

According to a sixteenth aspect, an embodiment of this application provides a communications apparatus, where the apparatus includes a receiving unit, a processing unit, and a sending unit. The receiving unit is configured to receive a first uplink service packet from the fixed network device. The processing unit is configured to encapsulate the first uplink service packet in an encapsulation manner corresponding to a tunnel, to obtain a second uplink service packet. The tunnel is a tunnel that is between the apparatus and a core network device and that corresponds to the fixed network device, and a communications network to which the core network device belongs is a 5G communications network or a communications network later than a 5G communications network. The sending unit is configured to send the second uplink service packet to the core network device through the tunnel. The processing unit encapsulates the first uplink service packet in the encapsulation manner corresponding to the tunnel, to obtain the second uplink service packet. Therefore, the sending unit can send the second uplink service packet to the core network device through the tunnel. In this way, the fixed network device can send the uplink service packet to a 5G core network or a core network later than a 5G core network.

In an embodiment, the receiving unit, the processing unit, and the sending unit may be further configured to perform an operation of the method in any possible implementation of the seventh aspect. Details are not described herein again.

According to a seventeenth aspect, an embodiment of this application provides a communications apparatus, where the apparatus includes a processor and a memory, the processor is connected to the memory, the memory stores one or more programs, the one or more programs are configured to be executed by the processor, and the one or more programs include instructions for performing the method in the first aspect or any embodiment of the first aspect.

According to an eighteenth aspect, an embodiment of this application provides a communications apparatus, where the apparatus includes a processor and a memory, the processor is connected to the memory, the memory stores one or more programs, the one or more programs are configured to be executed by the processor, and the one or more programs include instructions for performing the method in the second aspect, the fourth aspect, any embodiment of the second aspect, or any embodiment of the fourth aspect.

According to a nineteenth aspect, an embodiment of this application provides a communications apparatus, where the apparatus includes a processor and a memory, the processor is connected to the memory, the memory stores one or more programs, the one or more programs are configured to be executed by the processor, and the one or more programs include instructions for performing the method in the third aspect, the fifth aspect, any embodiment of the third aspect, or any embodiment of the fifth aspect.

According to a twentieth aspect, an embodiment of this application provides a communications apparatus, where the apparatus includes a processor and a memory, the processor is connected to the memory, the memory stores one or more programs, the one or more programs are configured to be executed by the processor, and the one or more programs include instructions for performing the method in the sixth aspect, the seventh aspect, any embodiment of the sixth aspect, or any embodiment of the seventh aspect.

According to a twenty-first aspect, an embodiment of this application provides a non-volatile computer-readable storage medium, configured to store a computer program. The computer program is loaded by a processor to execute instructions for performing the method in the first aspect, the second aspect, the third aspect, the fourth aspect, the fifth aspect, the sixth aspect, the seventh aspect, any embodiment of the first aspect, any embodiment of the second aspect, any embodiment of the third aspect, any embodiment of the fourth aspect, any embodiment of the fifth aspect, any embodiment of the sixth aspect, or any embodiment of the seventh aspect.

According to a twenty-second aspect, an embodiment of this application provides a chip, where the chip includes a programmable logic circuit and/or program instructions, and when running, the chip is configured to implement the method in the first aspect, the second aspect, the third aspect, the fourth aspect, the fifth aspect, the sixth aspect, the seventh aspect, any embodiment of the first aspect, any embodiment of the second aspect, any embodiment of the third aspect, any embodiment of the fourth aspect, any embodiment of the fifth aspect, any embodiment of the sixth aspect, or any embodiment of the seventh aspect.

DESCRIPTION OF EMBODIMENTS

The following further describes in detail the embodiments of this application with reference to the accompanying drawings.

Figure 1:
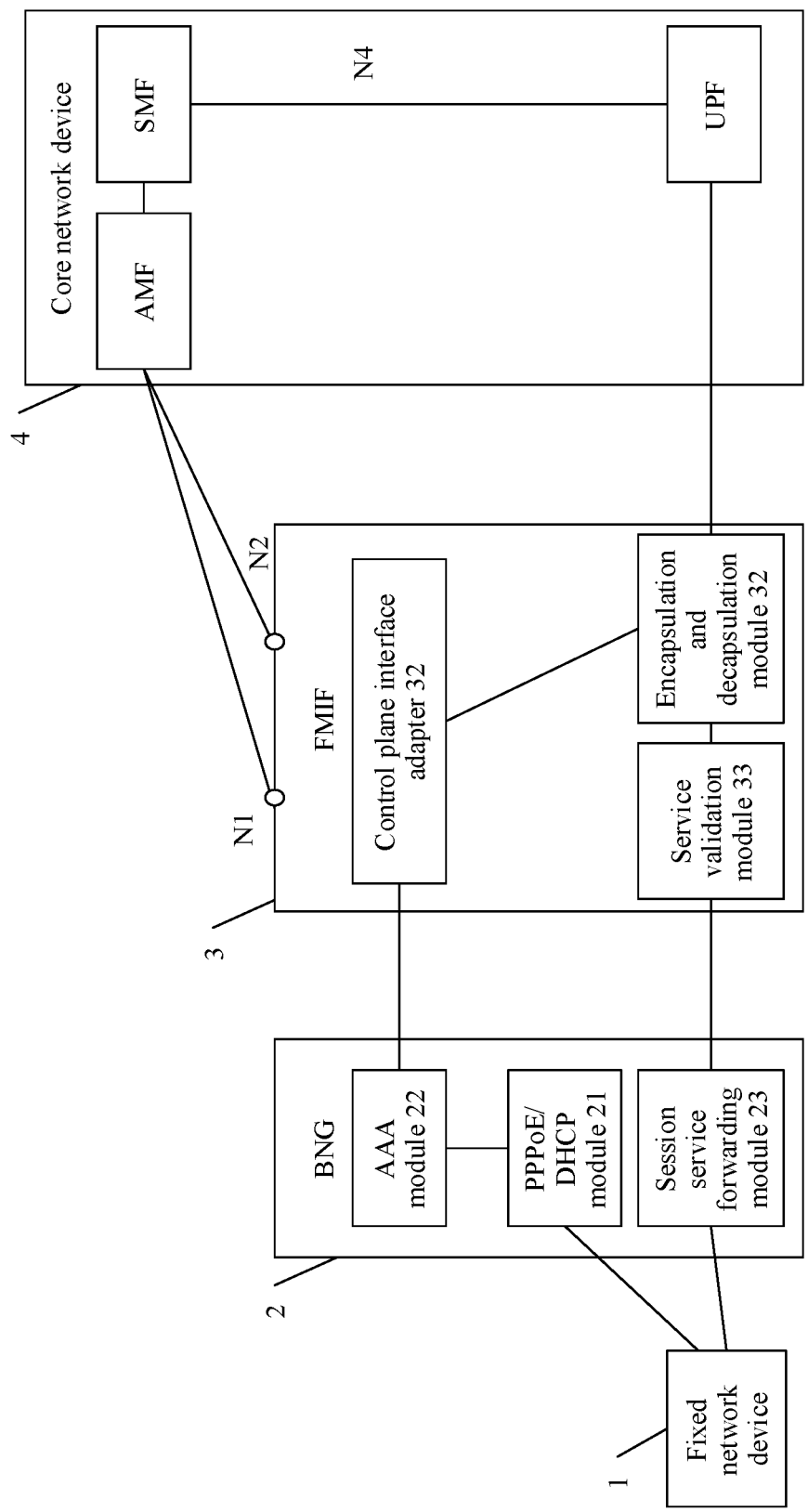
FIG. 1 is a schematic diagram of a network architecture according to an embodiment of this application.

Referring to FIG. 1, an embodiment of this application provides a network architecture, including: a fixed network device 1, a broadband network gateway (BNG) 2, a fixed mobile interworking function (FMIF) 3, and a core network device 4. The core network device 4 is located in a core network, and the core network device 4 may be a network element for implementing an access and mobility management function (AMF) function, a session management function (SMF) function, and a user plane function (UPF) function. The core network device 4 includes a virtual machine for implementing the AMF function, a virtual machine for implementing the SMF function, and a virtual machine for implementing the UPF function. The three virtual machines are referred to as an AMF, an SMF, and a UPF. Alternatively, the core network device 4 may include a core network control device for implementing an AMF function and an SMF function, and a UPF. In this case, the UPF may be a physical device, and can implement a UPF function. The core network control device for implementing the AMF function and the SMF function includes a virtual machine for implementing the AMF function and a virtual machine for implementing the SMF function. The two virtual machines are referred to as an AMF and an SMF.

A communications network to which the core network device 4 belongs is a 5G communications network or a communications network later than a 5G communications network. The core network may be a core network of the 5G communications network or a core network of the communications network later than the 5G communications network. The fixed network device 1 may be a fixed network residential gateway (FN-RG) or the like.

The FMIF 3 may communicate with the core network device 4 through a control plane interface and a data plane interface. The control plane interface may include an N1 interface or an N2 interface, and the data plane interface may be an N3 interface.

When the core network device 4 is a network element including an AMF, an SMF, and a UPF, the FMIF 3 may communicate with the AMF in the core network device 4 through the control plane interface, and the FMIF 3 may communicate with the UPF in the core network device 4 through the data plane interface. The SMF and the UPF communicate with each other through an interface between a control plane and a data plane.

When the core network device 4 includes a core network control device and a UPF, the FMIF 3 may communicate with an AMF in the core network control device through the control plane interface, and the FMIF 3 may communicate with the UPF through the data plane interface. An SMF in the core network control device and the UPF communicate with each other through an interface between a control plane and a data plane.

In an embodiment, the interface between the control plane and the data plane may be an N4 interface or the like.

Referring to FIG. 1, the BNG 2 includes a point-to-point protocol over Ethernet/dynamic host configuration protocol (PPPoE/DHCP) module 21, an authentication, authorization, and accounting (AAA) module 22, and a session service forwarding module 23. The FMIF 3 includes an encapsulation and decapsulation module 31 and a control plane interface adapter 32, and may further include a service validation module 33.

The fixed network device 1 may request, through the BNG 2 and the FMIF 3, the core network device 4 to perform authentication on the fixed network device 1. An authentication process may be as follows.

Figure 2A:
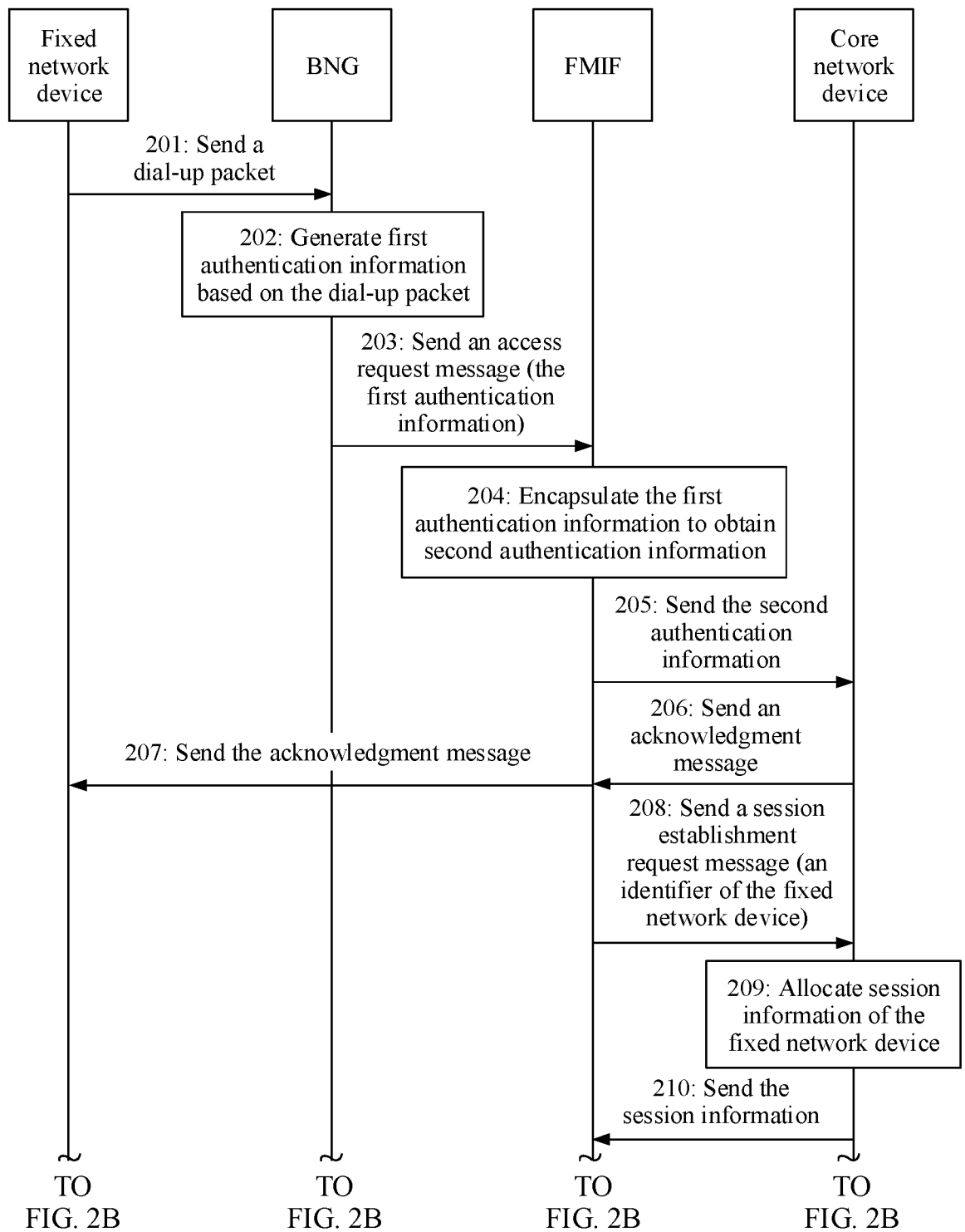
FIG. 2A and FIG. 2B are a flowchart of a communication method according to an embodiment of this application.
Figure 2B:
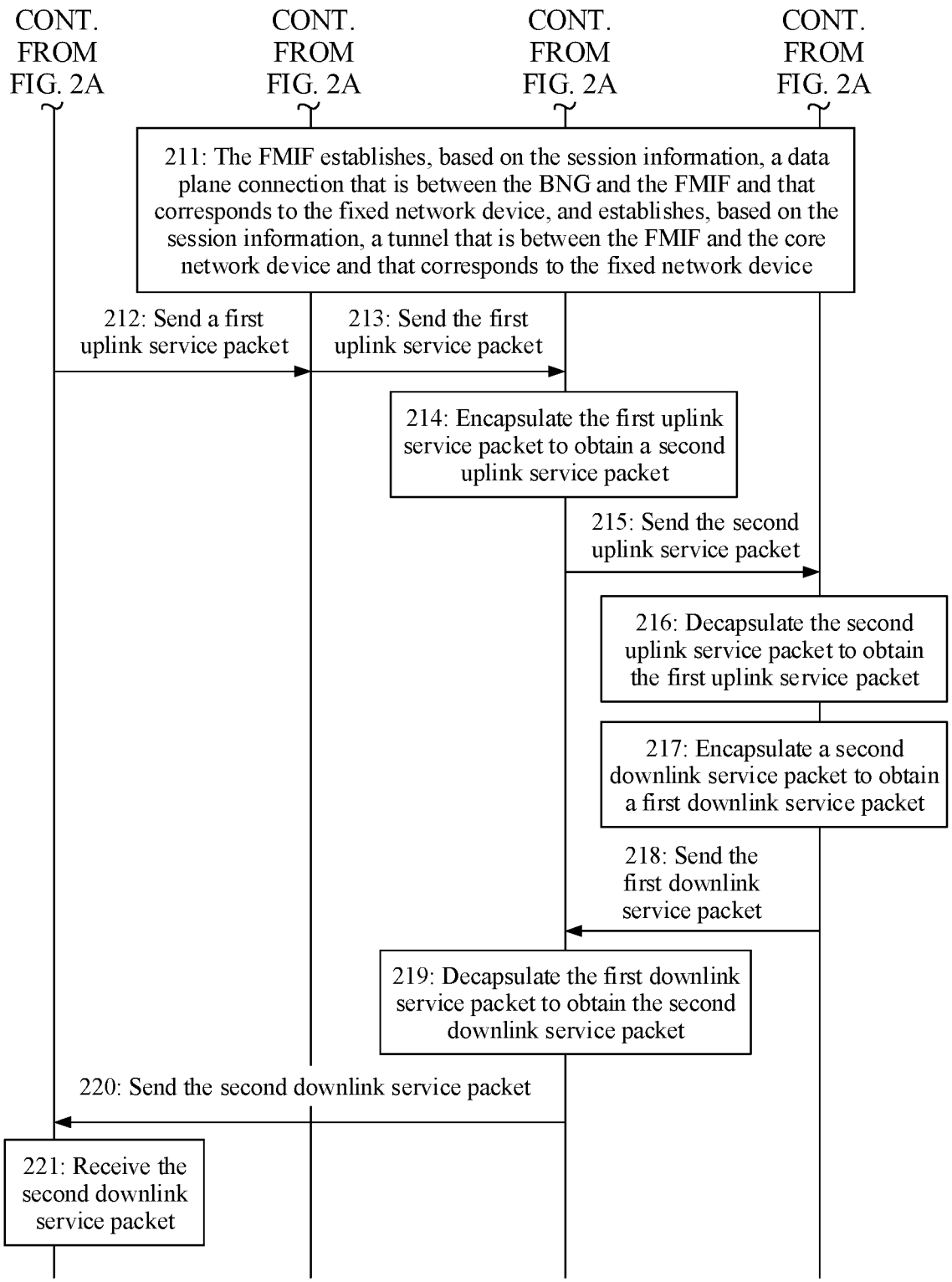

Refer to a process of operations 201 to 207 in FIG. 2A and FIG. 2B. The fixed network device 1 sends a dial-up packet to the BNG 2. The BNG 2 receives the dial-up packet; generates first authentication information of the fixed network device 1 based on the dial-up packet, where the first authentication information includes an identifier of the fixed network device; and sends an access request message to the FMIF 3, where the access request message carries the first authentication information. The FMIF 3 encapsulates the first authentication information in a message format supported by a control plane interface, to obtain second authentication information; and sends the second authentication information to the core network device 4 through the control plane interface. The core network device 4 performs authentication on the fixed network device 1 based on the second authentication information, and sends an acknowledgment message to the FMIF 3 after the authentication performed on the fixed network device 1 succeeds. Then, the FMIF 3 sends the acknowledgment message to the fixed network device 1 through the BNG 2.

In an embodiment, the identifier of the fixed network device may be a line ID. The first authentication information includes user name information of the fixed network device 1, and may further include password information of the fixed network device 1. The user name information includes the identifier of the fixed network device 1. Both the user name information and the password information of the fixed network device 1 are used by the core network device 4 to perform authentication on the fixed network device 1.

The control plane interface may include an N1 interface or an N2 interface. Assuming that the control plane interface is an N1 interface, the FMIF 3 encapsulates the first authentication information in a message format supported by the N1 interface, to obtain the second authentication information, where the second authentication information may be a subscription concealed identifier (SUCI), a subscription permanent identifier (SUPI), a 5G globally unique temporary UE identity (5G-GUTI), or the like. The SUCI, the SUPI, or the 5G-GUTI is 3GPP-defined information used for authentication in a core network.

In an embodiment, the fixed network device 1 accesses the BNG 2 through an access network, and a connection exists between the fixed network device 1 and the BNG 2. The PPPoE/DHCP module 21 in the BNG 2 receives the dial-up packet sent by the fixed network device 1 through the connection, generates the first authentication information based on the dial-up packet, and sends the first authentication information to the AAA module 22 in the BNG 2. The AAA module 22 sends, to the FMIF 3, the access request message carrying the first authentication information. The control plane interface adapter 32 in the FMIF 3 may receive the access request message; encapsulate, in the message format supported by the control plane interface, the first authentication information carried in the access request message, to obtain the second authentication information; and send the second authentication information to the core network device 4 through the control plane interface.

For a detailed process of performing authentication on the fixed network device 1, refer to related content in operations 201 to 207 in an embodiment shown in FIG. 2A and FIG. 2B. Details are not described herein.

After the authentication performed by the core network device 4 on the fixed network device 1 succeeds, a data plane connection between the fixed network device 1 and the core network device 4 may be established. In an embodiment, a process of establishing the data plane connection may be as follows.

Refer to operations 208 to 211 in FIG. 2A and FIG. 2B. The FMIF 3 sends a session establishment request message to the core network device 4 through the control plane interface, where the session establishment request message carries the identifier of the fixed network device 1. The core network device 4 receives the session establishment request message; allocates session information of the fixed network device 1 based on the identifier of the fixed network device 1 that is carried in the session establishment request message, where the session information includes an address of the fixed network device 1, a tunnel endpoint identifier (TEID) of a tunnel on the side of the core network device, a tunnel parameter of the tunnel, and the like, and the tunnel parameter may include quality of service (QoS), and the like; and sends the session information to the FMIF. The tunnel is a tunnel that is between the FMIF 3 and the core network device 4 and that corresponds to the fixed network device 1. The FMIF 3 receives the session information, establishes the tunnel based on the session information, and establishes a data plane connection that is between the FMIF 3 and the BNG 2 and that corresponds to the fixed network device.

It may be understood that, after receiving the acknowledgment message, the FMIF 3 may actively send the session establishment request message to the core network device 4, to request to establish the data plane connection between the fixed network device 1 and the core network device 4. Alternatively, after receiving the acknowledgment message, the fixed network device 1 sends the session establishment request message to the FMIF 3 through the BNG 2; and the FMIF 3 receives the session establishment request message, and sends the session establishment request message to the core network device 4.

The tunnel that is between the FMIF 3 and the core network device 4 and that corresponds to the fixed network device 1 may be a general packet radio service tunneling protocol-user plane (a GTP-U) tunnel, or the like.

For a process in which the FMIF 3 establishes the data plane connection that is between the FMIF 3 and the BNG 2 and that corresponds to the fixed network device 1 and a process in which the FMIF 3 establishes the tunnel that is between the FMIF 3 and the core network device 4 and that corresponds to the fixed network device 1, refer to related content in operations 208 to 211 in the embodiment shown in FIG. 2A and FIG. 2B. Details are not described herein.

After the data plane connection between the fixed network device 1 and the core network device 4 that is located in the core network is established, the fixed network device 1 may send an uplink service packet to the core network device 4, and then the core network device 4 forwards the uplink service packet. Alternatively, the core network device 4 obtains a downlink service packet of the fixed network device 1, and sends the downlink service packet to the fixed network device 1. In an embodiment, the implementation process is as follows.

For the uplink service packet, refer to operations 212 to 216 in FIG. 2A and FIG. 2B. The fixed network device 1 sends a first uplink service packet to the BNG 2. The BNG 2 receives the first uplink service packet, and sends the first uplink service packet to the FMIF 3 through the data plane connection that is between the BNG 2 and the FMIF 3 and that corresponds to the fixed network device 1. The FMIF 3 receives the first uplink service packet; encapsulates the first uplink service packet in an encapsulation manner corresponding to the tunnel, to obtain a second uplink service packet; and sends the second uplink service packet to the core network device 4 through the tunnel, where the tunnel is the tunnel that is between the FMIF 3 and the core network device 4 and that corresponds to the fixed network device 1. The core network device 4 receives the second uplink service packet; decapsulates the second uplink service packet in a decapsulation manner corresponding to the tunnel, to obtain the first uplink service packet; and forwards the first uplink service packet. For example, the core network device 4 may forward the first uplink service packet to a data network.

In an embodiment, in the foregoing process of transmitting the first uplink service packet, the session service forwarding module 23 in the BNG 2 may receive the first uplink service packet; detect, based on a preset field in a packet header of the first uplink service packet, whether the first uplink service packet is a packet of a mobile network service; and if the first uplink service packet is the packet of the mobile network service, send the first uplink service packet to the FMIF 3 through the data plane connection that is between the BNG 2 and the FMIF 3 and that corresponds to the fixed network device 1. The encapsulation and decapsulation module 31 in the FMIF 3 receives the first uplink service packet, and the service validation module 33 may validate whether the first uplink service packet is the packet of the mobile network service. If the first uplink service packet is the packet of the mobile network service, the first uplink service packet is encapsulated in the encapsulation manner corresponding to the tunnel, to obtain the second uplink service packet. If the first uplink service packet is not the packet of the mobile network service, the first uplink service packet is discarded. The tunnel is the tunnel that is between the FMIF 3 and the core network device 4 and that corresponds to the fixed network device 1.

In an embodiment, for a downlink service packet, refer to operations 217 to 221 in FIG. 2A and FIG. 2B. The core network device 4 obtains a second downlink service packet to be sent to the fixed network device 1; encapsulates the second downlink service packet in the encapsulation manner corresponding to the tunnel, to obtain a first downlink service packet; and sends the first downlink service packet to the FMIF 3 through the tunnel, where the tunnel is the tunnel that is between the FMIF 3 and the core network device 4 and that corresponds to the fixed network device 1. The FMIF 3 receives the first downlink service packet; decapsulates the first downlink service packet in the decapsulation manner corresponding to the tunnel, to obtain the second downlink service packet; and sends the second downlink service packet to the BNG 2 through the data plane connection that is between the BNG 2 and the FMIF 3 and that corresponds to the fixed network device 1. The BNG 2 receives the second downlink service packet, and sends the second downlink service packet to the fixed network device 1. The fixed network device 1 receives the second downlink service packet.

In the foregoing process of transmitting the second downlink service packet, the encapsulation and decapsulation module 31 in the FMIF 3 receives the first downlink service packet, and decapsulates the first downlink service packet in the decapsulation manner corresponding to the tunnel, to obtain the second downlink service packet.

Referring to FIG. 2A and FIG. 2B, an embodiment of this application provides a communication method. The method may be applied to the network architecture shown in FIG. 1. The method may be used by a fixed network device to request a core network device to perform authentication on the fixed network device. After the authentication performed on the fixed network device succeeds, the method may be used to establish a data plane connection between the fixed network device and a core network device. After the data plane connection is established, the method may be used to transmit an uplink service packet or a downlink service packet of the fixed network device.

In other words, the communication method includes a communication method for performing authentication on the fixed network device, a communication method for establishing a session connection between the fixed network device and the core network device, a communication method for transmitting the uplink service packet, and a communication method for transmitting the downlink service packet.

Referring to FIG. 2A and FIG. 2B, the communication method for performing authentication on the fixed network device includes the following operations 201 to 207. Operation 201 to operation 207 are separately as follows.

Operation 201: The fixed network device sends a dial-up packet to a BNG.

The fixed network device accesses the BNG through an access network. In other words, a connection exists between the fixed network device and the BNG. Therefore, the fixed network device can send the dial-up packet to the BNG through the connection.

The dial-up packet may include an identifier of the fixed network device, or may not include an identifier of the fixed network device. The identifier of the fixed network device may be a line identifier (Line ID) or the like.

Operation 202: The BNG receives the dial-up packet, and generates first authentication information of the fixed network device based on the dial-up packet, where the first authentication information includes the identifier of the fixed network device.

In this operation, when the dial-up packet includes the identifier of the fixed network device, the BNG may extract the identifier of the fixed network device from the dial-up packet, and generate the first authentication information of the fixed network device based on the identifier of the fixed network device. Alternatively, when the dial-up packet does not include the identifier of the fixed network device, the BNG may generate the identifier of the fixed network device based on a preset field in the dial-up packet, and generate the first authentication information of the fixed network device based on the identifier of the fixed network device.

The preset field in the dial-up packet may include at least one of DHCPv4 option 82 exchange, PPPoE circuit and remote attribute value pair insertion, an LDRA function on an access node, DHCPv6 option 18, or a Line ID Option (LIO) in an RS message.

The operation of generating the first authentication information by the BNG may be: The BNG generates user name information of the fixed network device based on the identifier of the fixed network device, where the user name information includes the identifier of the fixed network device, and the first authentication information includes the user name information. The BNG may further generate password information of the fixed network device, where the first authentication information may further include the password information.

The BNG includes a PPPoE/DHCP module and an AAA module. In this operation, the PPPoE/DHCP module may receive the dial-up packet sent by the fixed network device; extract the identifier of the fixed network device from the dial-up packet or generate the identifier of the fixed network device based on the preset field in the dial-up packet; generate the first authentication information of the fixed network device based on the identifier of the fixed network device; and send the first authentication information to the AAA module.

Operation 203: The BNG sends an access request message to an FMIF, where the access request message carries the first authentication information.

The BNG may communicate with the FMIF by using a communication protocol such as the remote authentication dial-in user service (Radius) protocol or the Diameter protocol. The access request message may be a Radius protocol access request message or a Diameter protocol access request message.

When the BNG communicates with the FMIF by using the Radius protocol, the BNG sends a Radius protocol access request message to the FMIF, where the Radius protocol access request message carries the first authentication information. When the BNG communicates with the FMIF by using the Diameter protocol, the BNG sends a Diameter protocol access request message to the FMIF, where the Diameter protocol access request message carries the first authentication information.

The BNG includes the PPPoE/DHCP module and the AAA module. In this operation, the AAA module may receive the first authentication information sent by the PPPoE/DHCP module, and send, to the FMIF, the access request message carrying the first authentication information.

Operation 204: The FMIF receives the access request message, and encapsulates, in a message format supported by a control plane interface, the first authentication information carried in the access request message, to obtain second authentication information.

The FMIF includes the control plane interface, and the control plane interface is an interface that is in the FMIF and that is used to communicate with a core network device. When the core network device is a network element including an AMF, an SMF, and a UPF, the control plane interface is an interface that is in the FMIF and that is used to communicate with the AMF in the core network device. When the core network device includes a core network control device and a UPF, the control plane interface is an interface that is in the FMIF and that is used to communicate with an AMF in the core network control device.

The control plane interface may be an N1 interface or an N2 interface. Assuming that the control plane interface is an N1 interface, the second authentication information may be an SUCI, an SUPI, or a 5G-GUTI, to be specific, the FMIF may encapsulate the first authentication information into the SUCI, the SUPI, or the 5G-GUTI in a message format supported by the N1 interface. The SUCI, the SUPI, or the 5G-GUTI is 3GPP-defined information used for authentication in a core network.

The FMIF includes a control plane interface adapter. In this operation, the control plane interface adapter may receive the access request message, and encapsulate, in the message format supported by the control plane interface, the first authentication information carried in the access request message, to obtain the second authentication information.

Operation 205: The FMIF sends the second authentication information to the core network device through the control plane interface.

Because the second authentication information is obtained through encapsulation in the message format supported by the control plane interface, the FMIF can send the second authentication information to the core network device through the control plane interface. This ensures that the second authentication information can be successfully sent to the core network device, so that the core network device can perform authentication on the fixed network device.

For example, the control plane interface is the N1 interface, and the second authentication information is the SUCI, the SUPI, or the 5G-GUTI. When the core network device is a network element including an AMF, an SMF, and a UPF, the FMIF sends the SUCI, the SUPI, or the 5G-GUTI to the core network device through the N1 interface. When the core network device includes a core network control device and a UPF, the FMIF sends the SUCI, the SUPI, or the 5G-GUTI to the core network control device through the N1 interface.

Operation 206: The core network device receives the second authentication information, performs authentication on the fixed network device based on the second authentication information, and sends an acknowledgment message to the FMIF after the authentication performed on the fixed network device succeeds.

In this operation, when the core network device is a network element including an AMF, an SMF, and a UPF, the AMF in the core network device performs authentication on the fixed network device by using an authentication server function (AUSF) based on the second authentication information, and sends the acknowledgment message to the FMIF after the authentication performed on the fixed network device succeeds. When the core network device includes a core network control device and a UPF, an AMF in the core network control device performs authentication on the fixed network device based on the second authentication information, and sends the acknowledgment message to the FMIF after the authentication performed on the fixed network device succeeds.

Operation 207: The FMIF receives the acknowledgment message through the control plane interface, and sends the acknowledgment message to the fixed network device.

The control plane interface may be the N1 interface, the N2 interface, or the like. The FMIF may receive the acknowledgment message through the N1 interface or the N2 interface, and send the acknowledgment message to the BNG. The BNG receives the acknowledgment message, and forwards the acknowledgment message to the fixed network device. The fixed network device receives the acknowledgment message, to complete authentication performed on the fixed network device.

After the authentication performed on the fixed network device is completed, a data plane connection between the fixed network device and the core network device may be established. The data plane connection between the fixed network device and the core network device includes a data plane connection between the fixed network device and the BNG, a data plane connection that is between the BNG and the FMIF and that corresponds to the fixed network device, and a tunnel that is between the FMIF and the core network device and that corresponds to the fixed network device. When the core network device is a network element including an AMF, an SMF, and a UPF, the tunnel that is between the FMIF and the core network device and that corresponds to the fixed network device is a tunnel that is between the FMIF and the UPF in the core network device and that corresponds to the fixed network device. When the core network device includes a core network control device and a UPF, the tunnel that is between the FMIF and the core network device and that corresponds to the fixed network device is a tunnel that is between the FMIF and the UPF and that corresponds to the fixed network device.

Because the data plane connection between the fixed network device and the BNG exists, the data plane connection that is between the BNG and the FMIF and that corresponds to the fixed network device and the tunnel that is between the FMIF and the core network device and that corresponds to the fixed network device are established, that is, establishment of the data plane connection between the fixed network device and the core network device is completed. The data plane connection between the fixed network device and the core network device may be established by using the following operations 208 to 211. Operations 208 to 211 are separately as follows.

Operation 208: The FMIF sends a session establishment request message to the core network device, where the session establishment request message includes the identifier of the fixed network device.

After receiving the acknowledgment message, the FMIF may actively send the session establishment request message to the core network device, to request to establish the data plane connection between the fixed network device and the core network device. Alternatively, after receiving the acknowledgment message, the fixed network device sends the session establishment request message to the FMIF through the BNG; and the FMIF receives the session establishment request message, and sends the session establishment request message to the core network device.

When the core network device is a network element including an AMF, an SMF, and a UPF, the FMIF sends the session establishment request message to the AMF in the core network device.

When the core network device includes a core network control device and a UPF, the FMIF sends the session establishment request message to the core network control device. During implementation, the FMIF sends the session establishment request message to an AMF in the core network control device.

The FMIF sends the session establishment request message to the core network device through the control plane interface. The control plane interface may be the N1 interface or the N2 interface. In other words, the FMIF may send the session establishment request message to the core network device through the N1 interface or the N2 interface.

In this operation, the FMIF may further allocate a TEID of the tunnel on the side of the FMIF. The session establishment request message may further carry the TEID of the tunnel on the side of the FMIF. The tunnel is the tunnel between the FMIF and the core network device.

Operation 209: The core network device receives the session establishment request message, and allocates session information of the fixed network device based on the identifier of the fixed network device that is included in the session establishment request message, where the session information includes an address of the fixed network device, a TEID of the tunnel on the side of the core network device, a tunnel parameter of the tunnel, and the like, and the tunnel is the tunnel that is between the FMIF and the core network device and that corresponds to the fixed network device.

When the core network device is a network element including an AMF, an SMF, and a UPF, in this operation, the AMF in the core network device receives the session establishment request message, and allocates the session information of the fixed network device based on the identifier of the fixed network device that is included in the session establishment request message.

When the core network device includes a core network control device and a UPF, in this operation, an AMF in the core network control device receives the session establishment request message, and allocates the session information of the fixed network device based on the identifier of the fixed network device that is included in the session establishment request message.

The session information allocated by the core network device may further include the TEID of the tunnel on the side of the FMIF. The tunnel parameter may include a parameter such as a quality of service flow identifier (QoS Flow ID, QFI).

Operation 210: The core network device sends the session information to the FMIF.

When the core network device is a network element including an AMF, an SMF, and a UPF, the AMF in the core network device sends the session information to the FMIF. The AMF in the core network device further transmits the session information to the SMF, and the SMF transmits the session information to the UPF through an interface between a control plane and a data plane.

When the core network device includes a core network control device and a UPF, an AMF in the core network control device sends the session information to the FMIF. The AMF in the core network control device further transmits the session information to an SMF, and the SMF in the core network control device sends the session information to the UPF through an interface between a control plane and a data plane.

The interface between the control plane and the data plane includes an N4 interface.

Operation 211: The FMIF receives the session information, establishes, based on the session information, the data plane connection that is between the BNG and the FMIF and that corresponds to the fixed network device, and establishes, based on the session information, the tunnel that is between the FMIF and the core network device and that corresponds to the fixed network device.

When the data plane connection is to be established, the FMIF and the BNG need to jointly complete the establishment. During implementation, the FMIF sends the address of the fixed network device to the BNG, and stores a correspondence between the address of the fixed network device and an address of the BNG into a first relationship table. The BNG receives the address of the fixed network device, and stores a correspondence between the address of the fixed network device and an address of the FMIF into a correspondence table, to establish the data plane connection.

When the tunnel is to be established, the FMIF and the core network device need to jointly complete the establishment. During implementation, when the session information includes the address of the fixed network device, the TEID of the tunnel on the side of the core network device, and the tunnel parameter of the tunnel, for the side of the FMIF, the FMIF allocates the TEID of the tunnel on the side of the FMIF, and allocates resources to the tunnel based on the tunnel parameter, where the resources may be resources such as a port and bandwidth; binds the resources to the TEID of the tunnel on the side of the FMIF; sends the TEID of the tunnel on the side of the FMIF to the core network device; and stores a correspondence between the address of the fixed network device, the TEID of the tunnel on the side of the FMIF, and the TEID of the tunnel on the side of the core network device into a second relationship table.

When the core network device is a network element including an AMF, an SMF, and a UPF, the FMIF sends the TEID of the tunnel on the side of the FMIF to the AMF in the core network device. When the core network device includes a core network control device and a UPF, the FMIF sends the TEID of the tunnel on the side of the FMIF to an AMF in the core network control device.

When the session information may further include the TEID of the tunnel on the side of the FMIF, the FMIF does not need to allocate the TEID of the tunnel on the side of the FMIF, and does not need to send the TEID of the tunnel on the side of the FMIF to the core network device, either.

For the side of the core network device, when the core network device includes an AMF, an SMF, and a UPF, and the session information includes the address of the fixed network device, the TEID of the tunnel on the side of the core network device, and the tunnel parameter of the tunnel, the AMF in the core network device receives the TEID of the tunnel on the side of the FMIF that is sent by the FMIF, and transmits the TEID of the tunnel on the side of the FMIF to the SMF. The SMF transmits the TEID of the tunnel on the side of the FMIF to the UPF through the interface between the control plane and the data plane. The UPF in the core network device receives the session information and the TEID of the tunnel on the side of the FMIF, and allocates resources to the tunnel based on the tunnel parameter, where the resources may be resources such as a port and bandwidth; binds the resources to the TEID of the tunnel on the side of the core network device; and stores the correspondence between the address of the fixed network device, the TEID of the tunnel on the side of the FMIF, and the TEID of the tunnel on the side of the core network device into a correspondence table, to establish the tunnel. It may be understood that, in an embodiment, after receiving the TEID of the tunnel on the side of the FMIF that is sent by the FMIF, the AMF in the core network device may send, to the SMF, the session information carrying the address of the fixed network device, the TEID of the tunnel on the side of the core network device, the TEID of the tunnel on the side of the FMIF, and the tunnel parameter of the tunnel. The SMF transmits the session information to the UPF through the interface between the control plane and the data plane.

When the core network device includes a core network control device and a UPF, and the session information includes the address of the fixed network device, the TEID of the tunnel on the side of the core network device, and the tunnel parameter of the tunnel, an AMF in the core network control device receives the TEID of the tunnel on the side of the FMIF that is sent by the FMIF, and transmits the TEID of the tunnel on the side of the FMIF to an SMF. The SMF sends the TEID of the tunnel on the side of the FMIF to the UPF through the interface between the control plane and the data plane. The UPF receives the session information and the TEID of the tunnel on the side of the FMIF, and allocates resources to the tunnel based on the tunnel parameter, where the resources may be resources such as a port and bandwidth; binds the resources to the TEID of the tunnel on the side of the core network device; and stores the correspondence between the address of the fixed network device, the TEID of the tunnel on the side of the FMIF, and the TEID of the tunnel on the side of the core network device into a correspondence table, to establish the tunnel. It may be understood that, in an embodiment, after receiving the TEID of the tunnel on the side of the FMIF that is sent by the FMIF, the AMF in the core network control device may send, to the SMF, the session information carrying the address of the fixed network device, the TEID of the tunnel on the side of the core network device, the TEID of the tunnel on the side of the FMIF, and the tunnel parameter of the tunnel. The SMF transmits the session information to the UPF through the interface between the control plane and the data plane.

When the session information may further include the TEID of the tunnel on the side of the FMIF, in this operation, the core network device or the core network control device does not need to receive the TEID of the tunnel on the side of the FMIF that is sent by the FMIF.

The FMIF may alternatively allocate the TEID of the tunnel on the side of the FMIF before sending the session establishment request message. In this way, the session establishment request message may carry the TEID of the tunnel on the side of the FMIF. In this case, the FMIF does not need to allocate the TEID of the tunnel on the side of the FMIF, and does not need to send the TEID of the tunnel on the side of the FMIF to the core network device, either.

After the data plane connection that is between the BNG and the FMIF and that corresponds to the fixed network device and the tunnel that is between the FMIF and the core network device and that corresponds to the fixed network device are established, because a data plane connection exists between the fixed network device and the FMIF, establishment of the data plane connection between the fixed network device and the core network device is completed.

The fixed network device may send the uplink service packet through the data plane connection between the fixed network device and the core network device, and may send the uplink service packet by using the following operations 212 to 216. Operation 212 to operation 216 are separately as follows.

Operation 212: The fixed network device sends a first uplink service packet to the BNG, where the first uplink service packet includes the address of the fixed network device.

A packet header of the first uplink service packet includes a source address field, and content carried in the source address field is the address of the fixed network device.

Operation 213: The BNG receives the first uplink service packet, and sends the first uplink service packet to the FMIF through the data plane connection between the BNG and the FMIF.

The BNG stores a correspondence table. The BNG extracts the address of the fixed network device from the first uplink service packet, obtains the address of the corresponding FMIF from the correspondence table based on the address of the fixed network device, and sends the first uplink service packet to the FMIF based on the address of the FMIF.

Only a packet of a mobile network service needs to be sent to the core network. In this operation, before sending the first uplink service packet to the FMIF, the BNG may further detect whether the first uplink service packet is the packet of the mobile network service. If the first uplink service packet is the packet of the mobile network service, the BNG sends the first uplink service packet to the FMIF through the data plane connection between the BNG and the FMIF.

The BNG may detect, based on a preset field in the packet header of the first uplink service packet, whether the first uplink service packet is the packet of the mobile network service.

The preset field may be a service virtual local area network (S-VLAN) field or the like.

If the first uplink service packet is the packet of the mobile network service, the preset field in the packet header of the first uplink service packet carries preset content. In this operation, the BNG may extract field content included in the preset field in the packet header of the first uplink service packet. If the field content is the preset content, the BNG detects that the first uplink service packet is the packet of the mobile network service. If the field content is not the preset content, the BNG detects that the first uplink service packet is not the packet of the mobile network service.

The BNG includes a session service forwarding module. In this operation, the session service forwarding module may detect whether the first uplink service packet is the packet of the mobile network service. If the first uplink service packet is the packet of the mobile network service, the session service forwarding module sends the first uplink service packet to the FMIF through the data plane connection that is between the BNG and the FMIF and that corresponds to the fixed network device.

Operation 214: The FMIF receives the first uplink service packet, and encapsulates the first uplink service packet in an encapsulation manner corresponding to the tunnel, to obtain a second uplink service packet, where the tunnel is the tunnel that is between the FMIF and the core network device and that corresponds to the fixed network device.

The FMIF receives the first uplink service packet, extracts the address of the fixed network device from the first uplink service packet, obtains, based on the address of the fixed network device, the TEID of the tunnel corresponding to the fixed network device on the side of the FMIF and the TEID of the tunnel corresponding to the fixed network device on the side of the core network device from the second relationship table, and adds, in the encapsulation manner corresponding to the tunnel, a packet header corresponding to the tunnel to the first uplink service packet, to obtain the second uplink service packet, where the packet header includes the obtained TEID on the side of the FMIF and the obtained TEID on the side of the core network device.

Before performing the operation of encapsulating the first uplink service packet, the FMIF may detect whether the first uplink service packet is the packet of the mobile network service. If the first uplink service packet is the packet of the mobile network service, the FMIF performs the operation of encapsulating the first uplink service packet.

The FMIF may detect, based on the preset field in the packet header of the first uplink service packet, whether the first uplink service packet is the packet of the mobile network service.

In this operation, the FMIF may extract the field content included in the preset field in the packet header of the first uplink service packet. If the field content is the preset content, the FMIF detects that the first uplink service packet is the packet of the mobile network service. If the field content is not the preset content, the FMIF detects that the first uplink service packet is not the packet of the mobile network service.

The FMIF includes a service validation module and an encapsulation and decapsulation module. The service validation module may detect whether the first uplink service packet is the packet of the mobile network service. If the first uplink service packet is the packet of the mobile network service, the encapsulation and decapsulation module performs the operation of encapsulating the first uplink service packet. If the first uplink service packet is not the packet of the mobile network service, the first uplink service packet is discarded.

Operation 215: The FMIF sends the second uplink service packet to the core network device through the tunnel.

The FMIF includes a data plane interface. The data plane interface is an interface that is in the FMIF and that is used to communicate with the core network device. The FMIF may send the second uplink service packet to the core network device through the tunnel by using the data plane interface.

When the core network device is a network element including an AMF, an SMF, and a UPF, the FMIF may send the second uplink service packet to the UPF in the core network device through the tunnel by using the data plane interface.

When the core network device includes a core network control device and a UPF, the FMIF may send the second uplink service packet to the UPF through the tunnel by using the data plane interface.

The data plane interface may be an N4 interface or the like.

Operation 216: The core network device receives the second uplink service packet, and decapsulates the second uplink service packet in a decapsulation manner corresponding to the tunnel, to obtain the first uplink service packet.

In this operation, the core network device receives the second uplink service packet, and removes, in the decapsulation manner corresponding to the tunnel, the packet header corresponding to the tunnel from the second uplink service packet, to obtain the first uplink service packet.

The core network device obtains the first uplink service packet, and may forward the first uplink service packet to a data network.

When the core network device is a network element including an AMF, an SMF, and a UPF, the UPF in the core network device receives the second uplink service packet, and removes, in the decapsulation manner corresponding to the tunnel, the packet header corresponding to the tunnel from the second uplink service packet, to obtain the first uplink service packet.

When the core network device includes a core network control device and a UPF, the UPF receives the second uplink service packet, and removes, in the decapsulation manner corresponding to the tunnel, the packet header corresponding to the tunnel from the second uplink service packet, to obtain the first uplink service packet.

The core network device may send the downlink service packet through the data plane connection between the core network device and the fixed network device, and may send the downlink service packet by using the following operations 217 to 221. Operation 217 to operation 221 are separately as follows.

Operation 217: The core network device obtains a second downlink service packet to be sent to the fixed network device, and encapsulates the second downlink service packet in the encapsulation manner corresponding to the tunnel, to obtain a first downlink service packet, where the tunnel is the tunnel that is between the FMIF and the core network device and that corresponds to the fixed network device.

The core network device receives the second downlink service packet from the data network, where the second downlink service packet includes the address of the fixed network device. A packet header of the second downlink service packet includes a destination address field, and the destination address field includes the address of the fixed network device.

In this operation, the core network device extracts the address of the fixed network device from the second downlink service packet, obtains, based on the address of the fixed network device, the TEID of the tunnel corresponding to the fixed network device on the side of the FMIF and the TEID of the tunnel corresponding to the fixed network device on the side of the core network device from the correspondence stored on the core network device, and adds, in the encapsulation manner corresponding to the tunnel, a packet header corresponding to the tunnel to the second downlink service packet, to obtain the first downlink service packet, where the packet header includes the obtained TEID on the side of the FMIF and the obtained TEID on the side of the core network device.

Operation 218: The core network device sends the first downlink service packet to the FMIF through the tunnel.

When the core network device is a network element including an AMF, an SMF, and a UPF, the UPF in the core network device obtains the second downlink service packet to be sent to the fixed network device; encapsulates the second downlink service packet in the encapsulation manner corresponding to the tunnel, to obtain the first downlink service packet; and sends the first downlink service packet to the FMIF through the tunnel.

When the core network device includes a core network control device and a UPF, the UPF obtains the second downlink service packet to be sent to the fixed network device; encapsulates the second downlink service packet in the encapsulation manner corresponding to the tunnel, to obtain the first downlink service packet; and sends the first downlink service packet to the FMIF through the tunnel.

Operation 219: The FMIF receives the first downlink service packet, and decapsulates the first downlink service packet in the decapsulation manner corresponding to the tunnel, to obtain the second downlink service packet.

The FMIF determines, in the decapsulation manner corresponding to the tunnel, the packet header corresponding to the tunnel from the first downlink service packet, and removes the determined packet header from the first downlink service packet, to obtain the second downlink service packet.

The FMIF includes an encapsulation and decapsulation module. The encapsulation and decapsulation module may receive the first downlink service packet, and decapsulate the first downlink service packet in the decapsulation manner corresponding to the tunnel, to obtain the second downlink service packet.

Operation 220: The FMIF sends the second downlink service packet to the fixed network device through the data plane connection that is between the FMIF and the BNG and that corresponds to the fixed network device.

The FMIF extracts the address of the fixed network device from the second downlink service packet, obtains the address of the corresponding BNG from the first relationship table based on the address of the fixed network device, and sends the second downlink service packet to the BNG based on the address of the BNG. The BNG receives the second downlink service packet, and forwards the second downlink service packet to the fixed network device.

Operation 221: The fixed network device receives the second downlink service packet.

In an embodiment of the application, after receiving the first authentication information of the fixed network device, the FMIF encapsulates the first authentication information in the message format supported by the control plane interface, to obtain the second authentication information. Because the second authentication information is obtained through encapsulation in the message format supported by the control plane interface, the FMIF can send the second authentication information to the core network device through the control plane interface. This ensures that the second authentication information can be successfully sent to the core network device, so that the core network device can perform authentication on the fixed network device. Because a communications network to which the core network device belongs is a 5G communications network or a communications network later than a 5G communications network, authentication can be performed on the fixed network device in a 5G core network or a core network later than a 5G core network. After the authentication succeeds, the FMIF sends, to the core network device, the session establishment request message carrying the identifier of the fixed network device; and the core network device allocates the session information of the fixed network device, and sends the session information to the FMIF. Because the session information includes content such as the address of the fixed network device and the TEID of the tunnel on the side of the core network device, the FMIF can establish the data plane connection between the fixed network device and the core network device based on the session information. In this way, a service packet can be transmitted between the fixed network device and the core network device through the data plane connection.

Figure 3:
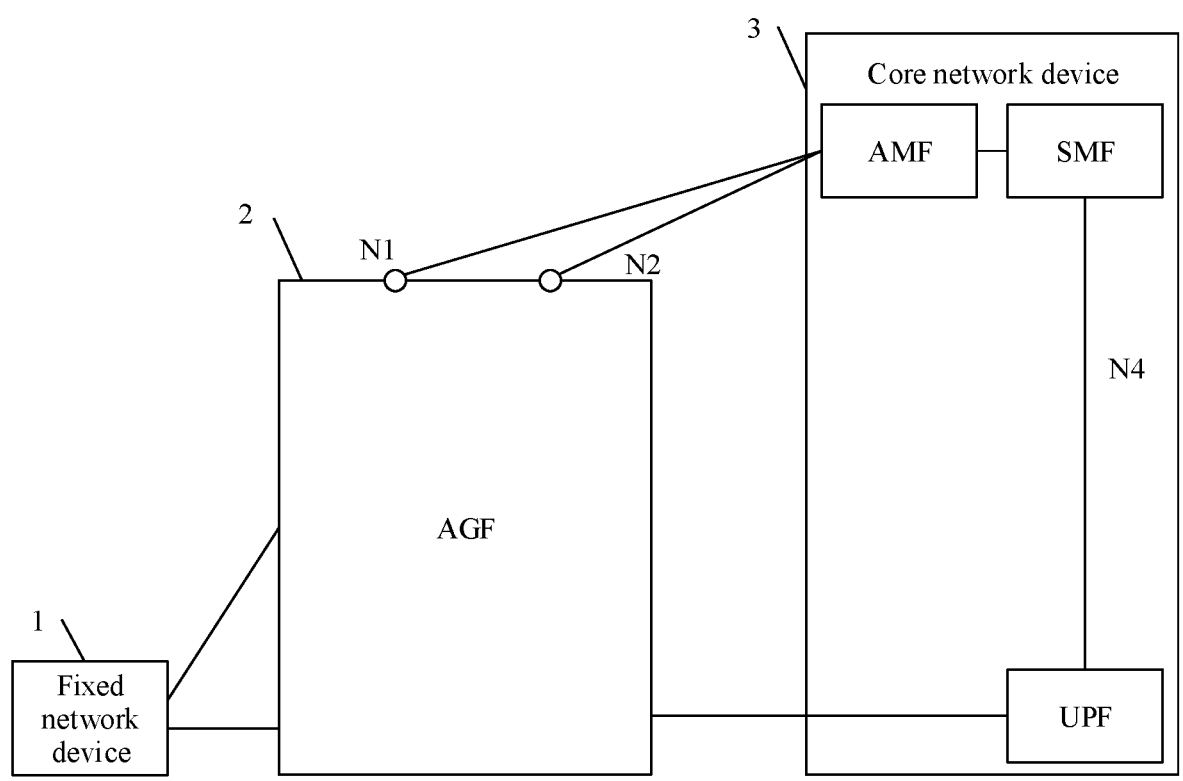
FIG. 3 is a schematic diagram of a network architecture according to an embodiment of this application.

Referring to FIG. 3, an embodiment of this application provides a network architecture. A difference between the network architecture and the network architecture shown in FIG. 1 lies in that an access gateway function (AGF) 2 is used to replace the BNG 2 and the FMIF 3, that is, a function of the BNG 2 and a function of the FMIF 3 are integrated into the AGF 2. The network architecture includes: a fixed network device 1, the AGF 2, and a core network device 3. The core network device 3 is located in a core network, the core network device 3 may be a network element for implementing an AMF function, an SMF function, and a UPF function, and the core network device 3 includes a virtual machine for implementing the AMF function, a virtual machine for implementing the SMF function, and a virtual machine for implementing the UPF function. The three virtual machines are referred to as an AMF, an SMF, and a UPF. Alternatively, the core network device 3 may include a core network control device for implementing an AMF function and an SMF function, and a UPF. The UPF is a physical device, and can implement a UPF function. The core network control device for implementing the AMF function and the SMF function includes a virtual machine for implementing the AMF function and a virtual machine for implementing the SMF function. The two virtual machines are referred to as an AMF and an SMF.

A communications network to which the core network device 3 belongs is a 5G communications network or a communications network later than a 5G communications network. The core network may be a core network of the 5G communications network or a core network of the communications network later than the 5G communications network. The fixed network device 1 may be an FN-RG or the like.

The AGF 2 may communicate with the core network device 3 through a control plane interface and a data plane interface. The control plane interface may include an N1 interface or an N2 interface, and the data plane interface may be an N3 interface.

When the core network device 3 is a network element including an AMF, an SMF, and a UPF, the AGF 2 may communicate with the AMF in the core network device 3 through the control plane interface, and the AGF 2 may communicate with the UPF in the core network device 3 through the data plane interface. The SMF and the UPF communicate with each other through an interface between a control plane and a data plane.

When the core network device 3 includes a core network control device and a UPF, the AGF 2 may communicate with an AMF in the core network control device through the control plane interface, and the AGF 2 may communicate with the UPF through the data plane interface. An SMF in the core network control device and the UPF communicate with each other through an interface between a control plane and a data plane.

In an embodiment, the interface between the control plane and the data plane may be an N4 interface or the like.

The fixed network device 1 may request, through the AGF 2, the core network device to perform authentication on the fixed network device 1. An authentication process may be as follows.

Figure 4A:
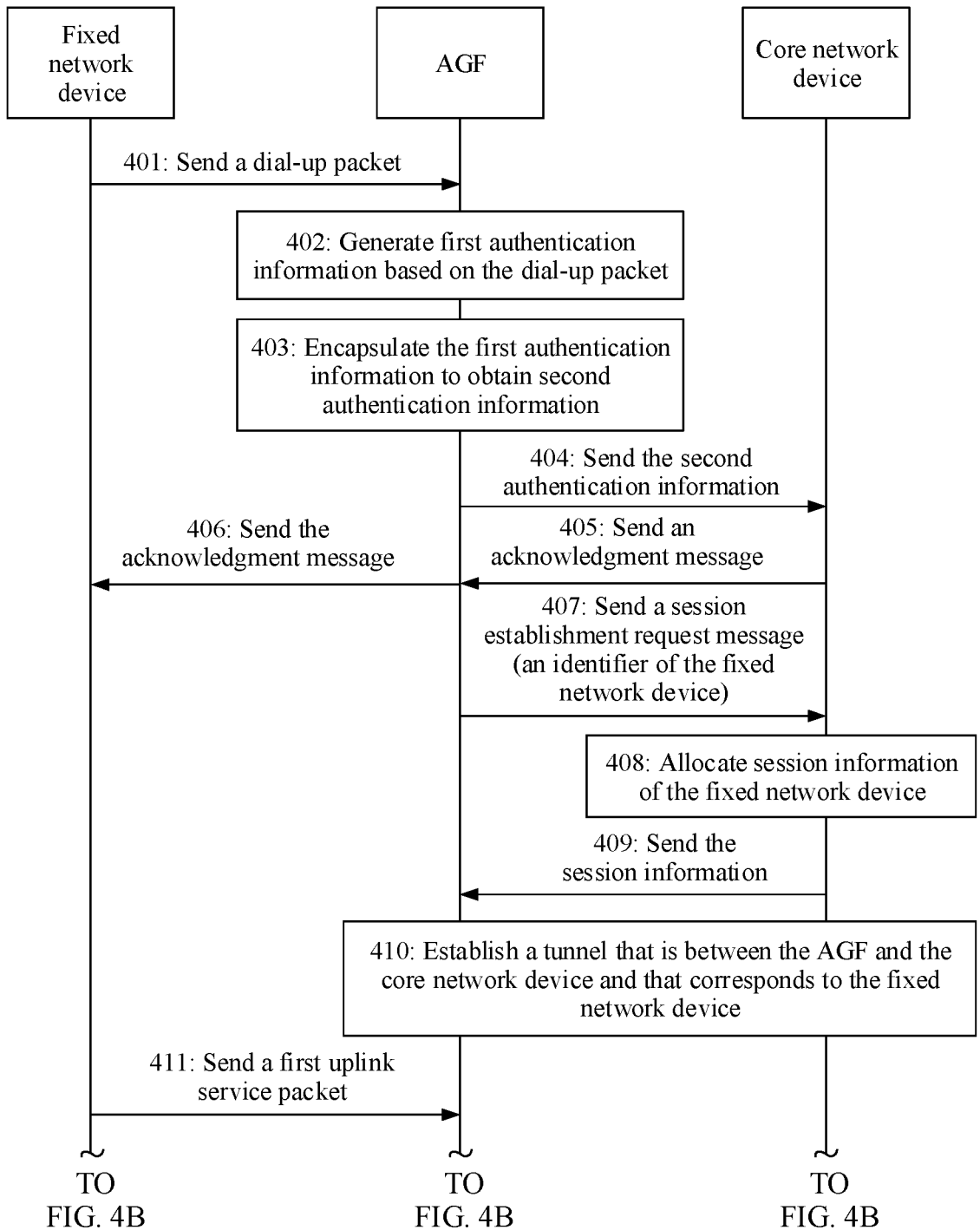
FIG. 4A and FIG. 4B are a flowchart of another communication method according to an embodiment of this application.
Figure 4B:
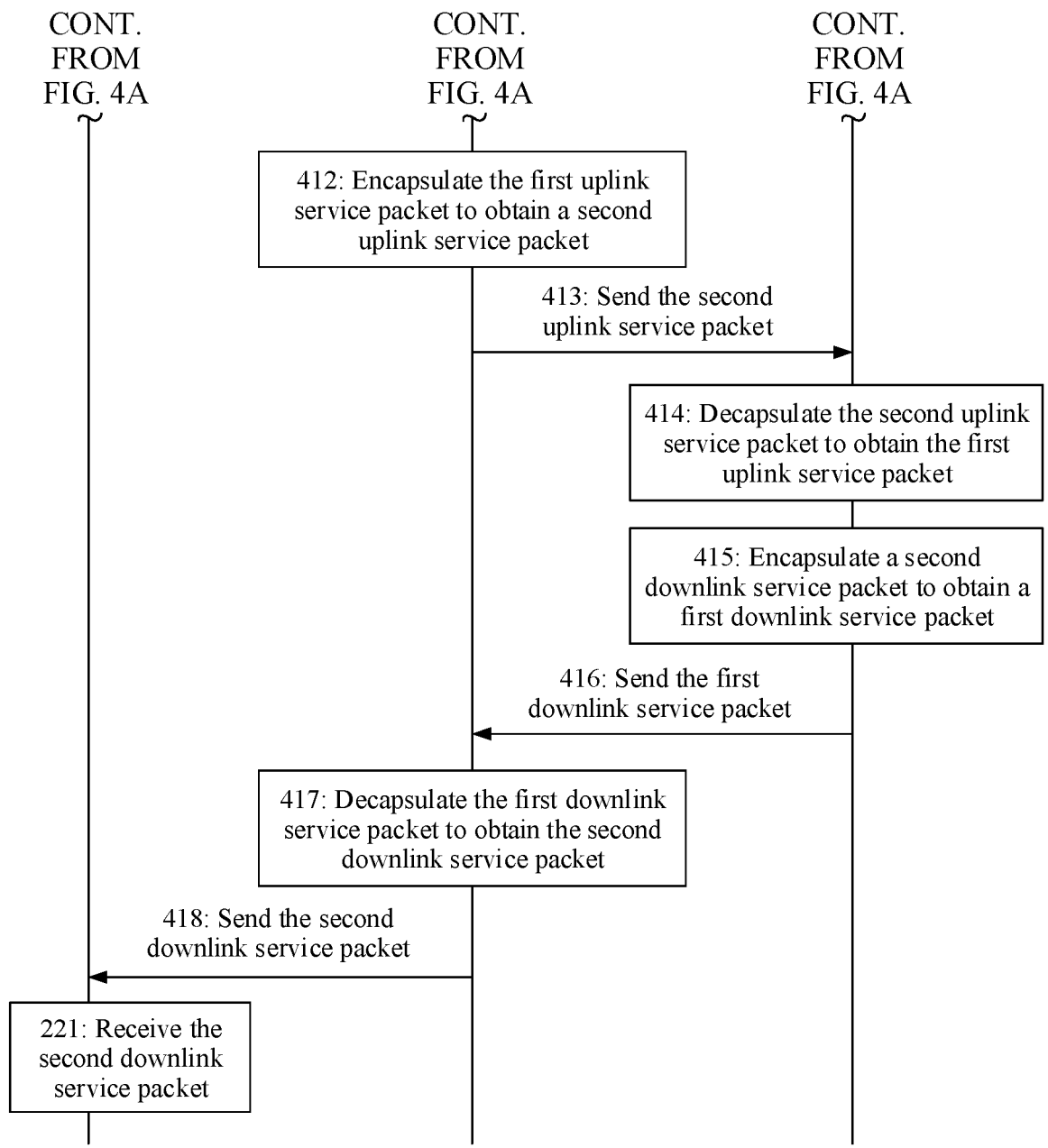

Refer to operations 401 to 406 in FIG. 4A and FIG. 4B. The fixed network device 1 sends a dial-up packet to the AGF 2. The AGF 2 receives the dial-up packet; generates first authentication information of the fixed network device 1 based on the dial-up packet, where the first authentication information includes an identifier of the fixed network device; encapsulates the first authentication information in a message format supported by a control plane interface, to obtain second authentication information; and sends the second authentication information to the core network device 3 through the control plane interface. The core network device 3 performs authentication on the fixed network device 1 based on the second authentication information, and sends an acknowledgment message to the AGF 2 after the authentication performed on the fixed network device 1 succeeds. The AGF 2 sends the acknowledgment message to the fixed network device 1.

For a detailed process in which the fixed network device 1 requests the core network device 4 to perform authentication, refer to related content in operations 401 to 406 in an embodiment shown in FIG. 4A and FIG. 4B. Details are not described herein.

After the authentication performed by the core network device on the fixed network device 1 succeeds, a data plane connection between the fixed network device 1 and the core network device may be established. In an embodiment, a process of establishing the data plane connection may be as follows.

Refer to operations 408 to 410 in FIG. 4A and FIG. 4B. The AGF 2 sends a session establishment request message to the core network device 3 through the control plane interface, where the session establishment request message carries the identifier of the fixed network device 1. The core network device 3 receives the session establishment request message; allocates session information of the fixed network device 1 based on the identifier of the fixed network device 1 that is included in the session establishment request message, where the session information includes an address of the fixed network device 1, a TEID of a tunnel on the side of the core network device 3, a tunnel parameter of the tunnel, and the like, and the tunnel is a tunnel that is between the AGF 2 and the core network device 3 and that corresponds to the fixed network device 1; and sends the session information to the AGF 2. The AGF 2 receives the session information, and establishes the tunnel based on the session information. The tunnel parameter may be a QoS parameter or the like. Because a data plane connection exists between the AGF 2 and the fixed network device 1, establishment of the data plane connection between the fixed network device 1 and the core network device 3 is completed. The data plane connection between the fixed network device 1 and the core network device 3 includes the data plane connection between the fixed network device 1 and the AGF 2 and the tunnel that is between the AGF 2 and the core network device and that corresponds to the fixed network device 1.

After receiving the acknowledgment message, the AGF 2 may actively send the session establishment request message to the core network device 3, to request to establish the data plane connection between the fixed network device 1 and the core network device 3. Alternatively, after receiving the acknowledgment message, the fixed network device 1 sends the session establishment request message to the AGF 2; and the AGF 2 receives the session establishment request message, and sends the session establishment request message to the core network device 3.

The tunnel that is between the AGF 2 and the core network device 3 and that corresponds to the fixed network device 1 may be a GTP-U tunnel or the like.

For a detailed process of establishing the data plane connection, refer to related content in operations 408 to 410 in the embodiment shown in FIG. 4A and FIG. 4B. Details are not described herein.

After the data plane connection between the fixed network device 1 and the core network device 3 that is located in the core network is established, the fixed network device 1 may send an uplink service packet to the core network device 3, and then the core network device 3 forwards the uplink service packet. Alternatively, the core network device 3 obtains a downlink service packet of the fixed network device 1, and sends the downlink service packet to the fixed network device 1. In an embodiment, an implementation process is as follows.

For the uplink service packet, refer to operations 411 to 414 in FIG. 4A and FIG. 4B. The fixed network device 1 sends a first uplink service packet to the AGF 2. The AGF 2 receives the first uplink service packet; encapsulates the first uplink service packet in an encapsulation manner corresponding to the tunnel, to obtain a second uplink service packet; and sends the second uplink service packet to the core network device 3 through the tunnel, where the tunnel is the tunnel that is between the AGF 2 and the core network device 3 and that corresponds to the fixed network device 1. The core network device 3 receives the second uplink service packet, and decapsulates the second uplink service packet in a decapsulation manner corresponding to the tunnel, to obtain the first uplink service packet.

For a downlink service packet, refer to operations 415 to 419 in FIG. 4A and FIG. 4B. The core network device 3 obtains a second downlink service packet to be sent to the fixed network device 1; encapsulates the second downlink service packet in the encapsulation manner corresponding to the tunnel, to obtain a first downlink service packet; and sends the first downlink service packet to the AGF 2 through the tunnel, where the tunnel is the tunnel that is between the AGF 2 and the core network device 3 and that corresponds to the fixed network device 1. The AGF 2 receives the first downlink service packet; decapsulates the first downlink service packet in the decapsulation manner corresponding to the tunnel, to obtain the second downlink service packet; and sends the second downlink service packet to the fixed network device 1. The fixed network device 1 receives the second downlink service packet.

Referring to FIG. 4A and FIG. 4B, an embodiment of this application provides a communication method. The method may be applied to the network architecture shown in FIG. 3. The method may be used by a fixed network device to request a core network device to perform authentication on the fixed network device. After the authentication performed on the fixed network device succeeds, the method may be used to establish a data plane connection between the fixed network device and a core network device. After the data plane connection is established, the method may be used to transmit an uplink service packet or a downlink service packet of the fixed network device.

In other words, the communication method includes a communication method for performing authentication on the fixed network device, a communication method for establishing the data plane connection between the fixed network device and the core network device, a communication method for transmitting the uplink service packet, and a communication method for transmitting the downlink service packet.

Referring to FIG. 4A and FIG. 4B, the communication method for performing authentication on the fixed network device includes the following operations 401 to 406. Operation 401 to operation 406 are separately as follows.

Operation 401: The fixed network device sends a dial-up packet to an AGF.

The fixed network device accesses the AGF through an access network. In other words, a connection exists between the fixed network device and the AGF. Therefore, the fixed network device can send the dial-up packet to the AGF through the connection.

The dial-up packet may include an identifier of the fixed network device, or may not include an identifier of the fixed network device. The identifier of the fixed network device may be a line ID or the like.

Operation 402: The AGF receives the dial-up packet, and generates first authentication information of the fixed network device based on the dial-up packet, where the first authentication information includes the identifier of the fixed network device.

In this operation, when the dial-up packet includes the identifier of the fixed network device, the AGF may extract the identifier of the fixed network device from the dial-up packet, and generate the first authentication information of the fixed network device based on the identifier of the fixed network device. Alternatively, when the dial-up packet does not include the identifier of the fixed network device, the AGF may generate the identifier of the fixed network device based on a preset field in the dial-up packet, and generate the first authentication information of the fixed network device based on the identifier of the fixed network device.

The preset field in the dial-up packet may include at least one of DHCPv4 option 82 exchange, PPPoE circuit and remote attribute value pair insertion, an LDRA function on an access node, DHCPv6 option 18, or a Line ID Option (LIO) in an RS message.

The operation of generating the first authentication information by the AGF may be: The AGF generates user name information of the fixed network device based on the identifier of the fixed network device, where the user name information includes the identifier of the fixed network device, and the first authentication information includes the user name information. The AGF may further generate password information of the fixed network device, where the first authentication information may further include the password information.

Operation 403: The AGF encapsulates the first authentication information in a message format supported by a control plane interface, to obtain second authentication information.

The AGF includes the control plane interface, and the control plane interface is an interface that is in the AGF and that is used to communicate with the core network device. When the core network device is a network element including an AMF, an SMF, and a UPF, the control plane interface is an interface that is in the AGF and that is used to communicate with the AMF in the core network device. When the core network device includes a core network control device and a UPF, the control plane interface is an interface that is in the AGF and that is used to communicate with an AMF in the core network control device.

The control plane interface may be an N1 interface or an N2 interface. Assuming that the control plane interface is an N1 interface, the second authentication information may be an SUCI, an SUPI, or a 5G-GUTI, to be specific, the AGF may encapsulate the first authentication information into the SUCI, the SUPI, or the 5G-GUTI in a message format supported by the N1 interface.

Operation 404: The AGF sends the second authentication information to the core network device through the control plane interface.

Because the second authentication information is obtained through encapsulation in the message format supported by the control plane interface, the AGF can send the second authentication information to the core network device through the control plane interface. This ensures that the second authentication information can be successfully sent to the core network device, so that the core network device can perform authentication on the fixed network device.

For example, the control plane interface is the N1 interface, and the second authentication information is the SUCI, the SUPI, or the 5G-GUTI. When the core network device is a network element including an AMF, an SMF, and a UPF, the AGF sends the SUCI, the SUPI, or the 5G-GUTI to the core network device through the N1 interface. When the core network device includes a core network control device and a UPF, the AGF sends the SUCI, the SUPI, or the 5G-GUTI to the core network control device through the N1 interface.

Operation 405: The core network device receives the second authentication information, performs authentication on the fixed network device based on the second authentication information, and sends an acknowledgment message to an AGF after the authentication performed on the fixed network device succeeds.

In this operation, when the core network device is a network element including an AMF, an SMF, and a UPF, the AMF in the core network device performs authentication on the fixed network device based on the second authentication information, and sends the acknowledgment message to the AGF after the authentication performed on the fixed network device succeeds. When the core network device includes a core network control device and a UPF, an AMF in the core network control device performs authentication on the fixed network device based on the second authentication information, and sends the acknowledgment message to the AGF after the authentication performed on the fixed network device succeeds.

Operation 406: The AGF receives the acknowledgment message through the control plane interface, and sends the acknowledgment message to the fixed network device.

The control plane interface may be the N1 interface, the N2 interface, or the like. The AGF may receive the acknowledgment message through the N1 interface or the N2 interface, and forward the acknowledgment message to the fixed network device. The fixed network device receives the acknowledgment message, to complete authentication performed on the fixed network device.

After the authentication performed on the fixed network device is completed, the data plane connection between the fixed network device and the core network device may be established. The data plane connection between the fixed network device and the core network device includes a data plane connection between the fixed network device and the AGF, and a tunnel that is between the AGF and the core network device and that corresponds to the fixed network device. When the core network device is a network element including an AMF, an SMF, and a UPF, the tunnel that is between the AGF and the core network device and that corresponds to the fixed network device is a tunnel that is between the AGF and the UPF in the core network device and that corresponds to the fixed network device. When the core network device includes a core network control device and a UPF, the tunnel that is between the AGF and the core network device and that corresponds to the fixed network device is a tunnel that is between the AGF and the UPF and that corresponds to the fixed network device.

Because the data plane connection between the fixed network device and the AGF exists, the tunnel that is between the AGF and the core network device and that corresponds to the fixed network device is established, that is, establishment of the data plane connection between the fixed network device and the core network device is completed. The data plane connection between the fixed network device and the core network device may be established by using the following operations 407 to 410. Operations 407 to 410 are separately as follows.

Operation 407: The AGF sends a session establishment request message to the core network device, where the session establishment request message includes the identifier of the fixed network device.

After receiving the acknowledgment message, the AGF may actively send the session establishment request message to the core network device, to request to establish the data plane connection between the fixed network device and the core network device. Alternatively, after receiving the acknowledgment message, the fixed network device sends the session establishment request message to the AGF; and the AGF receives the session establishment request message, and sends the session establishment request message to the core network device.

The AGF may further allocate a TEID of the tunnel on the side of the FMIF. The session establishment request message may further carry the TEID of the tunnel on the side of the FMIF. The tunnel is the tunnel that is between the AGF and the core network device and that corresponds to the fixed network device.

When the core network device is a network element including an AMF, an SMF, and a UPF, the AGF sends the session establishment request message to the AMF in the core network device.

When the core network device includes a core network control device and a UPF, the AGF sends the session establishment request message to the core network control device. During implementation, the AGF sends the session establishment request message to an AMF in the core network control device.

The AGF sends the session establishment request message to the core network device through the control plane interface. The control plane interface may be the N1 interface or the N2 interface. In other words, the AGF may send the session establishment request message to the core network device through the N1 interface or the N2 interface.

Operation 408: The core network device receives the session establishment request message, and allocates session information of the fixed network device based on the identifier of the fixed network device that is included in the session establishment request message, where the session information includes an address of the fixed network device, a TEID of the tunnel on the side of the core network device, a tunnel parameter of the tunnel, and the like, and the tunnel is the tunnel that is between the AGF and the core network device and that corresponds to the fixed network device.

When the core network device is a network element including an AMF, an SMF, and a UPF, in this operation, the AMF in the core network device receives the session establishment request message, and allocates the session information of the fixed network device based on the identifier of the fixed network device that is included in the session establishment request message.

When the core network device includes a core network control device and a UPF, in this operation, an AMF in the core network control device receives the session establishment request message, and allocates the session information of the fixed network device based on the identifier of the fixed network device that is included in the session establishment request message.

The session information allocated by the core network device may further include a TEID of the tunnel on the side of the AGF.

Operation 409: The core network device sends the session information to the AGF.

When the core network device is a network element including an AMF, an SMF, and a UPF, the AMF in the core network device sends the session information to the AGF. The AMF in the core network device further transmits the session information to the SMF, and the SMF transmits the session information to the UPF through an interface between a control plane and a data plane.

When the core network device includes a core network control device and a UPF, an AMF in the core network control device sends the session information to the AGF. The AMF further transmits the session information to an SMF, and the SMF in the core network control device sends the session information to the UPF through an interface between a control plane and a data plane.

The interface between the control plane and the data plane includes an N4 interface.

Operation 410: The AGF receives the session information, establishes the tunnel that is between the AGF and the core network device and that corresponds to the fixed network device.

When the tunnel is to be established, the AGF and the core network device need to jointly complete the establishment. During implementation, when the session information includes the address of the fixed network device, the TEID of the tunnel on the side of the core network device, and the tunnel parameter of the tunnel, for the side of the AGF, the AGF allocates the TEID of the tunnel on the side of the AGF, and allocates resources to the tunnel based on the tunnel parameter, where the resources may be resources such as a port and bandwidth; binds the resources to the TEID of the tunnel on the side of the AGF; sends the TEID of the tunnel on the side of the AGF to the core network device; and stores a correspondence between the address of the fixed network device, the TEID of the tunnel on the side of the AGF, and the TEID of the tunnel on the side of the core network device into a second relationship table.

When the core network device is a network element including an AMF, an SMF, and a UPF, the AGF sends the TEID of the tunnel on the side of the AGF to the AMF in the core network device. When the core network device includes a core network control device and a UPF, the AGF sends the TEID of the tunnel on the side of the AGF to an AMF in the core network control device.

The session information may further include the TEID of the tunnel on the side of the AGF. In this way, in this operation, the AGF does not need to allocate the TEID of the tunnel on the side of the AGF, and does not need to send the TEID of the tunnel on the side of the AGF to the core network device, either.

For the side of the core network device, when the session information includes the address of the fixed network device, the TEID of the tunnel on the side of the core network device, and the tunnel parameter of the tunnel, and the core network device is a network element including an AMF, an SMF, and a UPF, the AMF in the core network device receives the TEID of the tunnel on the side of the AGF that is sent by the AGF, and transmits the TEID of the tunnel on the side of the FMIF to the SMF. The SMF transmits the TEID of the tunnel on the side of the AGF to the UPF through the interface between the control plane and the data plane. The UPF in the core network device receives the session information and the TEID of the tunnel on the side of the AGF, and allocates resources to the tunnel based on the tunnel parameter, where the resources may be resources such as a port and bandwidth; binds the resources to the TEID of the tunnel on the side of the core network device; and stores the correspondence between the address of the fixed network device, the TEID of the tunnel on the side of the AGF, and the TEID of the tunnel on the side of the core network device into a correspondence table, to establish the tunnel. When the core network device includes a core network control device and a UPF, an AMF in the core network control device receives the TEID of the tunnel on the side of the AGF that is sent by the AGF, and transmits the TEID of the tunnel on the side of the AGF to an SMF. The SMF sends the TEID of the tunnel on the side of the AGF to the UPF through the interface between the control plane and the data plane. The UPF receives the session information and the TEID of the tunnel on the side of the FMIF, and allocates resources to the tunnel based on the tunnel parameter, where the resources may be resources such as a port and bandwidth; binds the resources to the TEID of the tunnel on the side of the core network device; and stores the correspondence between the address of the fixed network device, the TEID of the tunnel on the side of the FMIF, and the TEID of the tunnel on the side of the core network device into a correspondence table, to establish the tunnel.

The session information may further include the TEID of the tunnel on the side of the AGF. In this way, in this operation, the core network device or the core network control device does not need to receive the TEID of the tunnel on the side of the AGF that is sent by the AGF.

The AGF may alternatively allocate the TEID of the tunnel on the side of the AGF before sending the session establishment request message. In this way, the session establishment request message may carry the TEID of the tunnel on the side of the AGF. In this operation, after receiving the session information, the AGF does not need to allocate the TEID of the tunnel on the side of the AGF, and does not need to send the TEID of the tunnel on the side of the AGF to the core network device, either.

After the tunnel that is between the AGF and the core network device and that corresponds to the fixed network device is established, because a data plane connection exists between the fixed network device and the AGF, establishment of the data plane connection between the fixed network device and the core network device is completed.

The fixed network device may send the uplink service packet through the data plane connection between the fixed network device and the core network device, and may send the uplink service packet by using the following operations 411 to 414. Operation 411 to operation 414 are separately as follows.

Operation 411: The fixed network device sends a first uplink service packet to the AGF, where the first uplink service packet includes the address of the fixed network device.

A packet header of the first uplink service packet includes a source address field, and content carried in the source address field is the address of the fixed network device.

Operation 412: The AGF receives the first uplink service packet, and encapsulates the first uplink service packet in an encapsulation manner corresponding to the tunnel, to obtain a second uplink service packet, where the tunnel is the tunnel that is between the AGF and the core network device and that corresponds to the fixed network device.

The AGF receives the first uplink service packet, extracts the address of the fixed network device from the first uplink service packet, obtains, based on the address of the fixed network device, the TEID of the tunnel corresponding to the fixed network device on the side of the AGF and the TEID of the tunnel corresponding to the fixed network device on the side of the core network device from the second relationship table, and adds, in the encapsulation manner corresponding to the tunnel, a packet header corresponding to the tunnel to the first uplink service packet, to obtain the second uplink service packet, where the packet header includes the obtained TEID on the side of the AGF and the obtained TEID on the side of the core network device.

Before performing the operation of encapsulating the first uplink service packet, the AGF may detect whether the first uplink service packet is a packet of a mobile network service. If the first uplink service packet is the packet of the mobile network service, the AGF performs the operation of encapsulating the first uplink service packet.

The AGF may detect, based on a preset field in the packet header of the first uplink service packet, whether the first uplink service packet is the packet of the mobile network service.

In this operation, the AGF may extract field content included in the preset field in the packet header of the first uplink service packet. If the field content is preset content, the AGF detects that the first uplink service packet is the packet of the mobile network service. If the field content is not preset content, the AGF detects that the first uplink service packet is not the packet of the mobile network service.

The AGF includes a service validation module and an encapsulation and decapsulation module. The service validation module may detect whether the first uplink service packet is the packet of the mobile network service. If the first uplink service packet is the packet of the mobile network service, the encapsulation and decapsulation module performs the operation of encapsulating the first uplink service packet. If the first uplink service packet is not the packet of the mobile network service, the first uplink service packet is discarded.

Operation 413: The AGF sends the second uplink service packet to the core network device through the tunnel.

The AGF includes a data plane interface. The data plane interface is an interface that is in the AGF and that is used to communicate with the core network device. The AGF may send the second uplink service packet to the core network device through the tunnel by using the data plane interface.

When the core network device is a network element including an AMF, an SMF, and a UPF, the AGF may send the second uplink service packet to the UPF in the core network device through the tunnel by using the data plane interface.

When the core network device includes a core network control device and a UPF, the AGF may send the second uplink service packet to the UPF through the tunnel by using the data plane interface.

The data plane interface may be an N4 interface or the like.

Operation 414: The core network device receives the second uplink service packet, and decapsulates the second uplink service packet in a decapsulation manner corresponding to the tunnel, to obtain the first uplink service packet.

In this operation, the core network device receives the second uplink service packet, and removes, in the decapsulation manner corresponding to the tunnel, the packet header corresponding to the tunnel from the second uplink service packet, to obtain the first uplink service packet.

The core network device obtains the first uplink service packet, and may forward the first uplink service packet to a data network.

When the core network device is a network element including an AMF, an SMF, and a UPF, the UPF in the core network device receives the second uplink service packet, and removes, in the decapsulation manner corresponding to the tunnel, the packet header corresponding to the tunnel from the second uplink service packet, to obtain the first uplink service packet.

When the core network device includes a core network control device and a UPF, the UPF receives the second uplink service packet, and removes, in the decapsulation manner corresponding to the tunnel, the packet header corresponding to the tunnel from the second uplink service packet, to obtain the first uplink service packet.

The core network device may send the downlink service packet through the data plane connection between the core network device and the fixed network device, and may send the downlink service packet by using the following operations 415 to 419. Operation 415 to operation 419 are separately as follows.

Operation 415: The core network device obtains a second downlink service packet to be sent to the fixed network device, and encapsulates the second downlink service packet in the encapsulation manner corresponding to the tunnel, to obtain a first downlink service packet, where the tunnel is the tunnel that is between the AGF and the core network device and that corresponds to the fixed network device.

The core network device receives a second downlink service packet from the data network, where the second downlink service packet includes the address of the fixed network device. A packet header of the second downlink service packet includes a destination address field, and the destination address field includes the address of the fixed network device.

In this operation, the core network device extracts the address of the fixed network device from the second downlink service packet, obtains, based on the address of the fixed network device, the TEID of the tunnel corresponding to the fixed network device on the side of the AGF and the TEID of the tunnel corresponding to the fixed network device on the side of the core network device from the correspondence stored on the core network device, and adds, in the encapsulation manner corresponding to the tunnel, a packet header corresponding to the tunnel to the second downlink service packet, to obtain the first downlink service packet, where the packet header includes the obtained TEID on the side of the AGF and the obtained TEID on the side of the core network device.

Operation 416: The UPF sends the first downlink service packet to the AGF through the tunnel.

When the core network device is a network element including an AMF, an SMF, and a UPF, the UPF in the core network device obtains the second downlink service packet to be sent to the fixed network device; encapsulates the second downlink service packet in the encapsulation manner corresponding to the tunnel, to obtain the first downlink service packet; and sends the first downlink service packet to the AGF through the tunnel.

When the core network device includes a core network control device and a UPF, the UPF obtains the second downlink service packet to be sent to the fixed network device; encapsulates the second downlink service packet in the encapsulation manner corresponding to the tunnel, to obtain the first downlink service packet; and sends the first downlink service packet to the AGF through the tunnel.

Operation 417: The AGF receives the first downlink service packet, and decapsulates the first downlink service packet in the decapsulation manner corresponding to the tunnel, to obtain the second downlink service packet.

The AGF determines, in the decapsulation manner corresponding to the tunnel, the packet header corresponding to the tunnel from the first downlink service packet, and removes the determined packet header from the first downlink service packet, to obtain the second downlink service packet.

Operation 418: The AGF sends the second downlink service packet to the fixed network device.

Operation 419: The fixed network device receives the second downlink service packet.

In an embodiment of the application, after generating the first authentication information of the fixed network device, the AGF encapsulates the first authentication information in the message format supported by the control plane interface, to obtain the second authentication information. Because the second authentication information is obtained through encapsulation in the message format supported by the control plane interface, the AGF can send the second authentication information to the core network device through the control plane interface. This ensures that the second authentication information can be successfully sent to the core network device, so that the core network device can perform authentication on the fixed network device. Because a communications network to which the core network device belongs is a 5G communications network or a communications network later than a 5G communications network, authentication can be performed on the fixed network device in a 5G core network or a core network later than a 5G core network.

Figure 5:
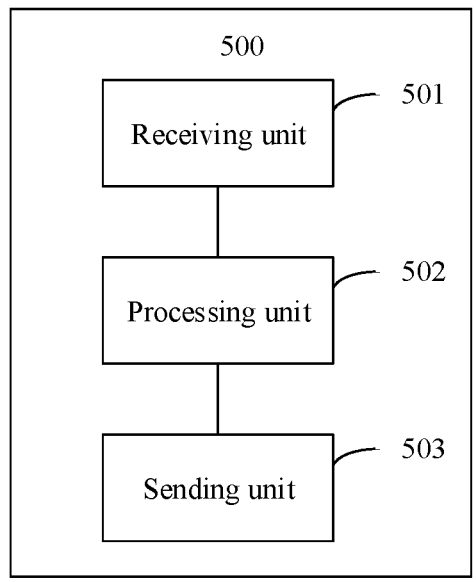
FIG. 5 is a schematic structural diagram of a communications apparatus according to an embodiment of this application.

Referring to FIG. 5, an embodiment of this application provides a communications apparatus 500. The apparatus 500 may be deployed in the BNG in any one of the foregoing embodiments, and includes the following units.

A receiving unit 501 is configured to receive a dial-up packet sent by a fixed network device.

A processing unit 502 is configured to generate first authentication information of the fixed network device based on the dial-up packet, where the first authentication information includes an identifier of the fixed network device.

A sending unit 503 is configured to send an access request message to a fixed mobile interworking function FMIF, where the access request message carries the first authentication information, the access request message is used by the FMIF to request a core network device to perform authentication on the fixed network device based on the first authentication information, and a communications network to which the core network device belongs is a 5G communications network or a communications network later than a 5G communications network.

In an embodiment, the access request message is a remote authentication dial-in user service Radius protocol access request message or a Diameter protocol access request message.

In an embodiment, for a detailed process in which the processing unit 502 and the sending unit 503 send the authentication information of the fixed network device to the core network device, refer to the operations performed by the BNG in operations 201 to 207 in the embodiment shown in FIG. 2A and FIG. 2B.

In an embodiment, the receiving unit 501 is further configured to receive an address of the fixed network device that is sent by the core network device through the FMIF, where the address of the fixed network device is assigned by the core network device after the core network device receives a session establishment request message carrying the identifier of the fixed network device, and the session establishment request message is sent by the FMIF after the authentication performed by the core network device on the fixed network device succeeds.

The processing unit 502 is further configured to establish, based on the address of the fixed network device and an address of the FMIF, a data plane connection that is between the apparatus 500 and the FMIF and that corresponds to the fixed network device.

In an embodiment, for a detailed process in which the processing unit 502 establishes the data plane connection, refer to the operations performed by the BNG in operations 208 to 211 in the embodiment shown in FIG. 2A and FIG. 2B.

In an embodiment, the receiving unit 501 is further configured to receive a first uplink service packet from the fixed network device, where the first uplink service packet includes the address of the fixed network device.

The processing unit 502 is further configured to obtain the address of the FMIF from a correspondence table based on the address of the fixed network device, where the correspondence table is used to store a correspondence between the address of the fixed network device and the address of the FMIF.

The sending unit 503 is further configured to send the first uplink service packet to the FMIF based on the address of the FMIF.

In an embodiment, the processing unit 502 is further configured to: detect, based on a preset field in a packet header of the first uplink service packet, whether the first uplink service packet is a packet of a mobile network service; and if the first uplink service packet is the packet of the mobile network service, perform the operation of obtaining the address of the FMIF from a correspondence table based on the address of the fixed network device. In this way, it can be ensured that only a service packet of a mobile network service is sent to the core network device.

In an embodiment, the receiving unit 501 is further configured to receive a second downlink service packet, where the second downlink service packet includes the address of the fixed network device.

The sending unit 503 is further configured to send the second downlink service packet to the fixed network device.

In an embodiment, for a detailed process in which the receiving unit 501, the processing unit 502, and the sending unit 503 forward the first uplink service packet, refer to the operations performed by the BNG in operations 212 to 216 in the embodiment shown in FIG. 2A and FIG. 2B. For a detailed process in which the receiving unit 501, the processing unit 502, and the sending unit 503 forward the second downlink service packet, refer to the operations performed by the BNG in operations 220 to 221 in the embodiment shown in FIG. 2A and FIG. 2B.

In an embodiment of the application, the processing unit generates the authentication information of the fixed network device, and the sending unit sends the authentication information of the fixed network device to the core network device through the FMIF, so that the core network device can perform authentication on the fixed network device. Because the communications network to which the core network device belongs is the 5G communications network or the communications network later than the 5G communications network, authentication can be performed on the fixed network device in a 5G core network or a core network later than a 5G core network. Further, after the authentication, the receiving unit receives the address of the fixed network device that is sent by the core network device through the FMIF, and the processing unit establishes, based on the address of the fixed network device and the address of the FMIF, the data plane connection that is between the apparatus and the FMIF and that corresponds to the fixed network device. Then, a data plane connection between the fixed network device and the core network device is further established. In this way, the apparatus sends a service packet to the 5G core network and receives a service packet from the fixed network device.

Figure 6:
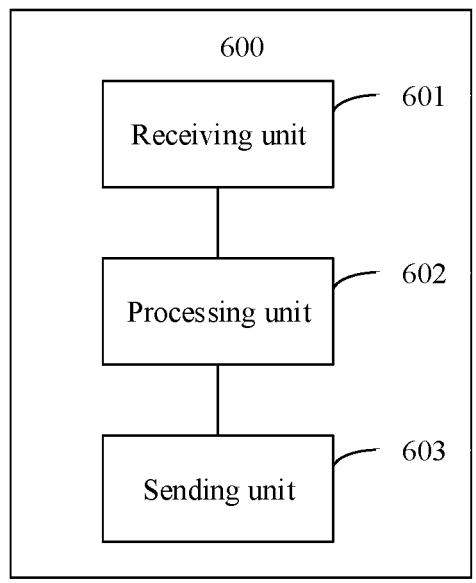
FIG. 6 is a schematic structural diagram of another communications apparatus according to an embodiment of this application.

Referring to FIG. 6, an embodiment of this application provides a communications apparatus 600. The apparatus 600 may be deployed in the FMIF in any one of the foregoing embodiments, and includes the following units.

A receiving unit 601 is configured to receive an access request message sent by a broadband network gateway BNG, where the access request message includes first authentication information of a fixed network device, the first authentication information is generated by the BNG based on a dial-up packet sent by the fixed network device, and the first authentication information includes an identifier of the fixed network device.

A processing unit 602 is configured to encapsulate the first authentication information in a message format supported by a control plane interface, to obtain second authentication information, where the control plane interface is an interface that is in the apparatus 600 and that is used to communicate with a core network device, and a communications network to which the core network device belongs is a 5G communications network or a communications network later than a 5G communications network.

A sending unit 603 is configured to send the second authentication information to the core network device through the control plane interface, where the second authentication information is used by the core network device to perform authentication on the fixed network device.

In an embodiment, the control plane interface includes an N1 interface or an N2 interface, and the second authentication information is an SUCI, an SUPI, or a 5G-GUTI.

In an embodiment, for a detailed process in which the processing unit 602 and the sending unit 603 send the authentication information of the fixed network device to the core network device, refer to the operations performed by the FMIF in operations 201 to 207 in the embodiment shown in FIG. 2A and FIG. 2B.

In an embodiment, the receiving unit 601 is further configured to receive an acknowledgment message sent by the core network device after the authentication succeeds.

The sending unit 603 is further configured to send a session establishment request message to the core network device, where the session establishment request message carries the identifier of the fixed network device, the session establishment request message is used by the core network device to allocate session information, the session information includes an address of the fixed network device, a tunnel endpoint identifier TEID of a tunnel on the side of the core network device, and a tunnel parameter of the tunnel, and the tunnel is a tunnel that is between the apparatus and the core network device and that corresponds to the fixed network device.

The receiving unit 601 is further configured to receive the session information sent by the core network device.

The processing unit 602 is further configured to: establish, based on the session information, a data plane connection that is between the apparatus and the BNG and that corresponds to the fixed network device, and establish the tunnel based on the session information.

In an embodiment, for a detailed process in which the processing unit 602 establishes the data plane connection that is between the apparatus and the BNG and that corresponds to the fixed network device, and establishes the tunnel, refer to the operations performed by the FMIF in operations 208 to 211 in the embodiment shown in FIG. 2A and FIG. 2B.

In an embodiment, the sending unit 603 is further configured to send the address of the fixed network device to the BNG.

The processing unit is configured to store a correspondence between the address of the fixed network device and an address of the BNG into a first relationship table, where the first relationship table is used by the apparatus to transmit a downlink service packet of the fixed network device.

In an embodiment, the receiving unit 601 is further configured to receive a downlink service packet of the fixed network device that is sent by the core network device. The processing unit 602 determines, based on a first correspondence table, the BNG connected to the fixed network device. The sending unit 603 sends the downlink service packet to the fixed network device through the data plane connection that is between the communications apparatus and the BNG and that corresponds to the fixed network device.

The processing unit 602 is further configured to store a correspondence between the address of the fixed network device, a TEID of the tunnel on the side of the apparatus, and the TEID of the tunnel on the side of the core network device into a second relationship table, where the second relationship table is used by the communications apparatus to send an uplink service packet of the fixed network device. For example, after receiving the first uplink service packet sent by the BNG, the communications apparatus encapsulates the first uplink service packet based on the second relationship table, to obtain a second uplink service packet, and sends the second uplink service packet to the core network device through the tunnel.

In an embodiment, the session information further includes the TEID of the tunnel on the side of the apparatus.

In an embodiment, the processing unit 602 is further configured to allocate the TEID of the tunnel on the side of the apparatus.

The sending unit is further configured to send the TEID of the tunnel on the side of the apparatus to the core network device, where the TEID of the tunnel on the side of the apparatus is stored by the core network device into a correspondence table, the correspondence table includes the correspondence between the address of the fixed network device, the TEID of the tunnel on the side of the apparatus, and the TEID of the tunnel on the side of the core network device, and the correspondence table is used by the core network device to transmit a downlink service packet of the fixed network device. For example, after obtaining a second downlink service packet to be sent to the fixed network device, the core network device encapsulates the second downlink service packet based on the correspondence table, to obtain a first downlink service packet, and sends the first downlink service packet to the communications apparatus through the tunnel.

In an embodiment, the sending unit 603 is further configured to send the session establishment request message to the core network device through the control plane interface, where the control plane interface includes the N1 interface or the N2 interface.

In an embodiment of the application, the processing unit encapsulates the first authentication information in the message format supported by the control plane interface, to obtain the second authentication information. Because the second authentication information is obtained through encapsulation in the message format supported by the control plane interface, the sending unit can send the second authentication information to the core network device through the control plane interface. This ensures that the second authentication information can be successfully sent to the core network device, so that the core network device can perform authentication on the fixed network device. Because the communications network to which the core network device belongs is the 5G communications network or the communications network later than the 5G communications network, authentication can be performed on the fixed network device in a 5G core network or a core network later than a 5G core network. Further, after the authentication, the receiving unit receives the session information of the fixed network device that is sent by the core network device; and the processing unit establishes, based on the session information, the data plane connection that is between the apparatus and the BNG and that corresponds to the fixed network device, and the tunnel that is between the apparatus and the core network device and that corresponds to the fixed network device. Then, a data plane connection between the fixed network device and the core network device is established. In this way, the communications apparatus sends a service packet to the 5G core network and receives a service packet from the fixed network device.

Figure 7:
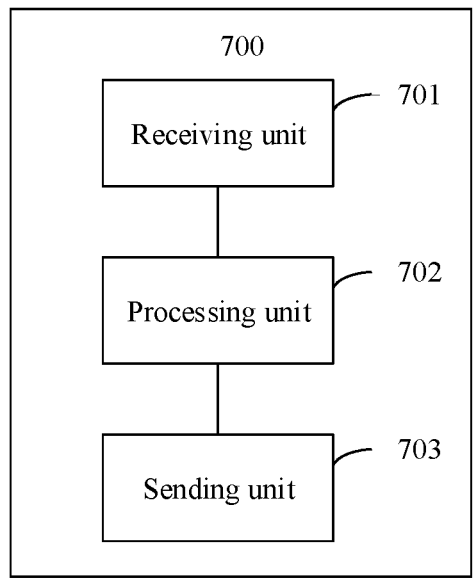
FIG. 7 is a schematic structural diagram of another communications apparatus according to an embodiment of this application.

Referring to FIG. 7, an embodiment of this application provides a communications apparatus 700. The apparatus 700 may be deployed in the core network device in any one of the foregoing embodiments, and includes the following units.

A receiving unit 701 is configured to receive a session establishment request message from a fixed mobile interworking function FMIF, where the session establishment request message includes an identifier of a fixed network device, and a communications network to which the apparatus belongs is a 5G communications network or a communications network later than a 5G communications network.

A processing unit 702 is configured to allocate session information to the fixed network device based on the identifier of the fixed network device, where the session information includes an address of the fixed network device, a tunnel endpoint identifier TEID of a tunnel on the side of the apparatus, and a tunnel parameter of the tunnel, and the tunnel is a tunnel that is between the FMIF and the apparatus and that corresponds to the fixed network device.

A sending unit 703 is configured to send the session information to the FMIF, where the session information is used by the FMIF to establish a data plane connection between the fixed network device and the core network device.

In an embodiment, for a detailed process in which the processing unit 702 allocates the session information and the sending unit 703 sends the session information, refer to the operations performed by the core network device in operations 208 to 211 in the embodiment shown in FIG. 2A and FIG. 2B.

In an embodiment, the receiving unit 701 is further configured to receive the second authentication information sent by the FMIF, where the second authentication information is obtained by the FMIF by encapsulating first authentication information in a message format supported by a control plane interface, the control plane interface is an interface that is in the FMIF and that is used to communicate with the apparatus, and the first authentication information includes the identifier of the fixed network device.

The processing unit 702 is further configured to perform authentication on the fixed network device based on the second authentication information.

In an embodiment, for a detailed process in which the receiving unit 701 receives the second authentication information and the processing unit 702 performs authentication on the fixed network device, refer to the operations performed by the core network device in operations 201 to 207 in the embodiment shown in FIG. 2A and FIG. 2B.

In an embodiment, the processing unit 702 is further configured to store a correspondence between the address of the fixed network device, a TEID of the tunnel on the side of the FMIF, and the TEID of the tunnel on the side of the apparatus into a correspondence table, where the correspondence table is used by the apparatus to transmit a downlink service packet of the fixed network device.

In an embodiment, for a detailed process in which the processing unit 702 transmits the downlink service packet of the fixed network device, refer to the operations performed by the core network device in operations 217 to 221 in the embodiment shown in FIG. 2A and FIG. 2B.

In an embodiment, the session information further includes the TEID of the tunnel on the side of the FMIF, or the session establishment request message further carries the TEID of the tunnel on the side of the FMIF that is allocated by the FMIF.

In an embodiment, the receiving unit is further configured to receive the TEID of the tunnel on the side of the FMIF that is sent by the FMIF, where the TEID of the tunnel on the side of the FMIF is allocated by the FMIF.

In an embodiment of the application, the processing unit allocates the session information, where the session information includes the address of the fixed network device, the tunnel endpoint identifier TEID of the tunnel on the side of the apparatus, and the tunnel parameter of the tunnel; and the sending unit sends the session information to the FMIF. In this way, the FMIF can establish the data plane connection between the fixed network device and the core network device, so that a service packet of the fixed network device can be transmitted through the data plane connection.

Figure 8:
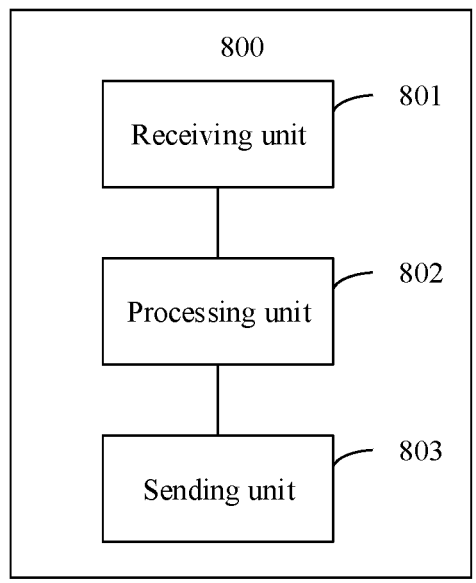
FIG. 8 is a schematic structural diagram of another communications apparatus according to an embodiment of this application.

Referring to FIG. 8, an embodiment of this application provides a communications apparatus 800. The apparatus 800 may be deployed in the FMIF in any one of the foregoing embodiments, and includes the following units.

A receiving unit 801 is configured to receive a first uplink service packet from the fixed network device.

A processing unit 802 is configured to encapsulate the first uplink service packet in an encapsulation manner corresponding to a tunnel, to obtain a second uplink service packet, where the tunnel is a tunnel that is between the apparatus and a core network device and that corresponds to the fixed network device, and a communications network to which the core network device belongs is a 5G communications network or a communications network later than a 5G communications network.

A sending unit 803 is configured to send the second uplink service packet to the core network device through the tunnel.

In an embodiment, for a detailed process in which the processing unit 802 encapsulates the first uplink service packet and the sending unit 803 sends the first uplink service packet, refer to the operations performed by the FMIF in operations 211 to 214 in the embodiment shown in FIG. 2A and FIG. 2B.

In an embodiment, the first uplink service packet includes an address of the fixed network device.

The processing unit 802 is configured to obtain a tunnel endpoint identifier TEID of the tunnel on the side of the apparatus and a TEID of the tunnel on the side of the core network device from a second relationship table based on the address of the fixed network device, where the second relationship table is used to store a correspondence between the address of the fixed network device, the TEID on the side of the apparatus, and the TEID on the side of the core network device.

The processing unit 802 is further configured to add, in the encapsulation manner corresponding to the tunnel, a packet header corresponding to the tunnel to the first uplink service packet, to obtain the second uplink service packet, where the packet header includes the obtained TEID on the side of the apparatus and the obtained TEID on the side of the core network device.

In an embodiment, the processing unit 802 is further configured to: detect, based on a preset field in the packet header of the first uplink service packet, whether the first uplink service packet is a packet of a mobile network service; and if the first uplink service packet is the packet of the mobile network service, perform the operation of encapsulating the first uplink service packet in an encapsulation manner corresponding to a tunnel, to obtain a second uplink service packet.

In an embodiment, the receiving unit 801 is further configured to receive a first downlink service packet sent by the core network device to the fixed network device.

The processing unit 802 is configured to decapsulate the first downlink service packet in a decapsulation manner corresponding to the tunnel, to obtain a second downlink service packet.

The sending unit 803 is configured to send the second downlink service packet to the fixed network device through a data plane connection that is between the apparatus and the BNG and that corresponds to the fixed network device.

In an embodiment, the processing unit 802 is configured to remove, in the decapsulation manner corresponding to the tunnel, the packet header corresponding to the tunnel from the first downlink service packet, to obtain the second downlink service packet.

In an embodiment, for a detailed process in which the receiving unit 801, the processing unit 802, and the sending unit 803 transmit the downlink service packet of the fixed network device, refer to the operations performed by the FMIF in operations 215 to 221 in the embodiment shown in FIG. 2A and FIG. 2B.

In an embodiment, the tunnel is a general packet radio service tunneling protocol-user plane GTP-U tunnel.

In an embodiment of the application, the processing unit encapsulates the first uplink service packet in the encapsulation manner corresponding to the tunnel, to obtain the second uplink service packet. The sending unit sends the second uplink service packet to the core network device through the tunnel. In this way, the uplink service packet of the fixed network device can be sent to a core network device in a 5G core network or a core network later than a 5G core network.

Figure 9:
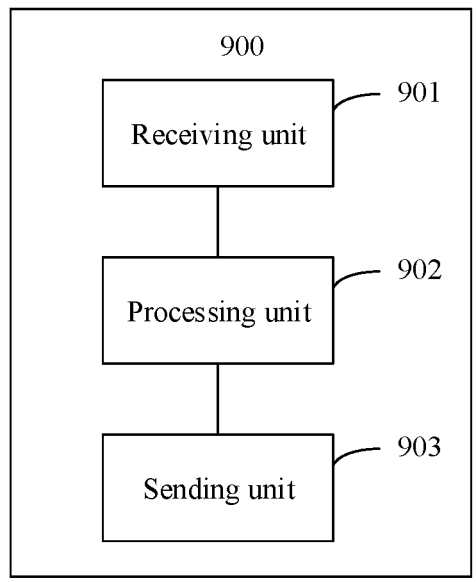
FIG. 9 is a schematic structural diagram of another communications apparatus according to an embodiment of this application.

Referring to FIG. 9, an embodiment of this application provides a communications apparatus 900. The apparatus 900 may be deployed in the core network device in any one of the foregoing embodiments, and includes the following units.

A receiving unit 901 is configured to receive a second uplink service packet from a fixed mobile interworking function FMIF, where the second uplink service packet is obtained by the FMIF by encapsulating a first uplink service packet from the fixed network device in an encapsulation manner corresponding to a tunnel, the tunnel is a tunnel that is between the FMIF and the apparatus and that corresponds to the fixed network device, and a communications network to which the apparatus belongs is a 5G communications network or a communications network later than a 5G communications network.

A processing unit 902 is configured to decapsulate the second uplink service packet in a decapsulation manner corresponding to the tunnel, to obtain the first uplink service packet.

In an embodiment, for a detailed process in which the receiving unit 901 receives the second uplink service packet and the processing unit 902 decapsulates the second uplink service packet, refer to the operations performed by the core network device in operations 211 to 214 in the embodiment shown in FIG. 2A and FIG. 2B.

In an embodiment, the apparatus 900 further includes a sending unit 903.

The processing unit 902 is configured to: obtain a second downlink service packet to be sent to the fixed network device; and encapsulate the second downlink service packet in the encapsulation manner corresponding to the tunnel, to obtain a first downlink service packet.

The sending unit 903 is configured to send the first downlink service packet to the FMIF through the tunnel.

In an embodiment, the second downlink service packet includes an address of the fixed network device.

The processing unit 902 is configured to obtain a tunnel endpoint identifier TEID of the tunnel on the side of the FMIF and a TEID of the tunnel on the side of the apparatus from a correspondence table based on the address of the fixed network device, where the correspondence table is used to store a correspondence between the address of the fixed network device, the TEID on the side of the FMIF, and the TEID on the side of the apparatus.

The processing unit 902 is further configured to add, in the encapsulation manner corresponding to the tunnel, a packet header corresponding to the tunnel to the second downlink service packet, to obtain the first downlink service packet, where the packet header includes the obtained TEID on the side of the FMIF and the obtained TEID on the side of the apparatus.

In an embodiment, for a detailed process in which the sending unit 903 and the processing unit 902 transmit the downlink service packet of the fixed network device, refer to the operations performed by the core network device in operations 215 to 221 in the embodiment shown in FIG. 2A and FIG. 2B.

In an embodiment, the tunnel is a general packet radio service tunneling protocol-user plane GTP-U tunnel.

In an embodiment of the application, the receiving unit receives the second uplink service packet from the FMIF. The processing unit decapsulates the second uplink service packet in the decapsulation manner corresponding to the tunnel, to obtain the first uplink service packet. In this way, a core network device in a 5G core network or a core network later than a 5G core network can receive the uplink service packet of the fixed network device.

Figure 10:
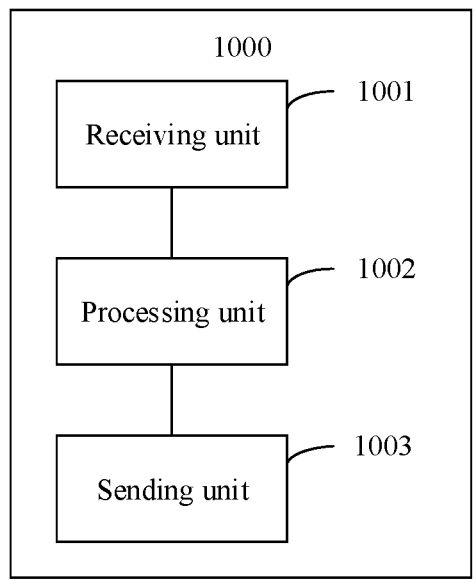
FIG. 10 is a schematic structural diagram of another communications apparatus according to an embodiment of this application.

Referring to FIG. 10, an embodiment of this application provides a communications apparatus 1000. The apparatus 1000 may be deployed in the AGF in any one of the foregoing embodiments, and includes the following units.

A receiving unit 1001 is configured to receive a dial-up packet sent by a fixed network device.

A processing unit is configured to: generate first authentication information of the fixed network device based on the dial-up packet, where the first authentication information includes an identifier of the fixed network device; and encapsulate the first authentication information in a message format supported by a control plane interface, to obtain second authentication information, where the control plane interface is an interface that is in the apparatus 1000 and that is used to communicate with a core network device, and a communications network to which the core network device belongs is a 5G communications network or a communications network later than a 5G communications network.

A sending unit 1003 is configured to send the second authentication information to the core network device through the control plane interface, where the second authentication information is used by the core network device to perform authentication on the fixed network device.

In an embodiment, for a detailed process in which the receiving unit 1001, the processing unit 1002, and the sending unit 1003 perform authentication on the fixed network device, refer to the operations performed by the AGF in operations 401 to 406 in the embodiment shown in FIG. 4A and FIG. 4B.

In an embodiment, the control plane interface includes an N1 interface or an N2 interface, and the second authentication information is a subscription concealed identifier SUCI, a subscription permanent identifier SUPI, or a 5G globally unique temporary UE identity 5G-GUTI.

In an embodiment, the receiving unit 1001 is further configured to receive an acknowledgment message sent by the core network device after the authentication succeeds.

The sending unit 1003 is further configured to send a session establishment request message to the core network device, where the session establishment request message carries the identifier of the fixed network device, the session establishment request message is used by the core network device to allocate session information, the session information includes an address of the fixed network device, a tunnel endpoint identifier TEID of a tunnel on the side of the core network device, and a tunnel parameter of the tunnel, and the tunnel is a tunnel that is between the apparatus 1000 and the core network device and that corresponds to the fixed network device.

The receiving unit 1001 is further configured to receive the session information sent by the core network device.

The processing unit 1002 is further configured to establish the tunnel based on the session information.

In an embodiment, for a detailed process in which the receiving unit 1001, the processing unit 1002, and the sending unit 1003 establish the tunnel, refer to the operations performed by the AGF in operations 407 to 410 in the embodiment shown in FIG. 2A and FIG. 2B.

In an embodiment, the processing unit is further configured to store a correspondence between the address of the fixed network device, a TEID of the tunnel on the side of the apparatus 1000, and the TEID of the tunnel on the side of the core network device into a second relationship table, where the second relationship table is used by the apparatus 1000 to send an uplink service packet of the fixed network device.

In an embodiment, the session information further includes the TEID of the tunnel on the side of the apparatus 1000.

In an embodiment, the processing unit 1002 is further configured to: allocate the TEID of the tunnel on the side of the apparatus 1000, and send the TEID of the tunnel on the side of the apparatus 1000 to the core network device, where the TEID of the tunnel on the side of the apparatus 1000 is stored by the core network device into a correspondence table, the correspondence table includes the correspondence between the address of the fixed network device, the TEID of the tunnel on the side of the apparatus 1000, and the TEID of the tunnel on the side of the core network device, and the correspondence table is used by the core network device to transmit a downlink service packet of the fixed network device.

In an embodiment, the AGF sends the session establishment request message to the core network device through the control plane interface, where the control plane interface includes the N1 interface or the N2 interface.

In an embodiment of the application, the processing unit encapsulates the first authentication information in the message format supported by the control plane interface, to obtain the second authentication information. Because the second authentication information is obtained through encapsulation in the message format supported by the control plane interface, the sending unit can send the second authentication information to the core network device through the control plane interface. This ensures that the second authentication information can be successfully sent to the core network device, so that the core network device can perform authentication on the fixed network device. Because the communications network to which the core network device belongs is the 5G communications network or the communications network later than the 5G communications network, authentication can be performed on the fixed network device in a 5G core network or a core network later than a 5G core network. Further, after the authentication, the receiving unit receives the session information of the fixed network device that is sent by the core network device, and the processing unit establishes, based on the session information, the tunnel that is between the apparatus and the core network device and that corresponds to the fixed network device. Then, a data plane connection between the fixed network device and the core network device is established. In this way, the communications apparatus sends a service packet to the 5G core network and receives a service packet from the fixed network device.

Figure 11:
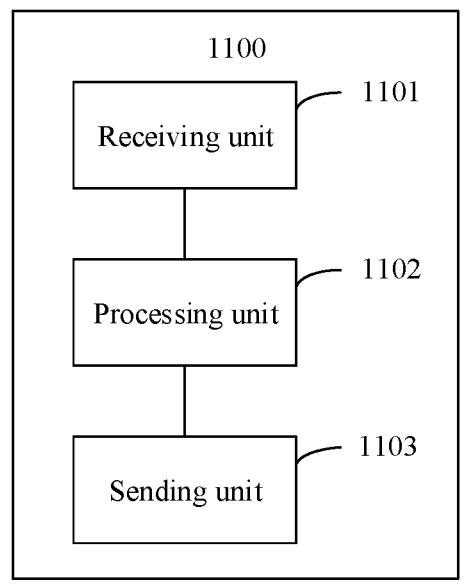
FIG. 11 is a schematic structural diagram of another communications apparatus according to an embodiment of this application.

Referring to FIG. 11, an embodiment of this application provides a communications apparatus 1100. The apparatus 1100 may be deployed in the AGF in any one of the foregoing embodiments, and includes the following units.

A receiving unit 1101 is configured to receive a first uplink service packet from the fixed network device.

A processing unit 1102 is configured to encapsulate the first uplink service packet in an encapsulation manner corresponding to a tunnel, to obtain a second uplink service packet, where the tunnel is a tunnel that is between the AGF and a core network device and that corresponds to the fixed network device, and a communications network to which the core network device belongs is a 5G communications network or a communications network later than a 5G communications network.

A sending unit 1103 is configured to send the second uplink service packet to the core network device through the tunnel.

In an embodiment, the first uplink service packet includes an address of the fixed network device.

The processing unit 1102 is configured to obtain a tunnel endpoint identifier TEID of the tunnel on the side of the apparatus 1100 and a TEID of the tunnel on the side of the core network device from a second relationship table based on the address of the fixed network device, where the second relationship table is used to store a correspondence between the address of the fixed network device, the TEID on the side of the apparatus 1100, and the TEID on the side of the core network device.

The processing unit 1102 is further configured to add, in the encapsulation manner corresponding to the tunnel, a packet header corresponding to the tunnel to the first uplink service packet, to obtain the second uplink service packet, where the packet header includes the obtained TEID on the side of the apparatus 1100, and the obtained TEID on the side of the core network device.

In an embodiment, the processing unit 1102 is further configured to: detect, based on a preset field in the packet header of the first uplink service packet, whether the first uplink service packet is a packet of a mobile network service; and if the first uplink service packet is the packet of the mobile network service, perform the operation of encapsulating the first uplink service packet in an encapsulation manner corresponding to a tunnel, to obtain a second uplink service packet.

In an embodiment, for a detailed process in which the receiving unit 1101, the processing unit 1102, and the sending unit 1103 transmit the uplink service packet of the fixed network device, refer to the operations performed by the AGF in operations 411 to 414 in the embodiment shown in FIG. 2A and FIG. 2B.

In an embodiment, the receiving unit 1101 is further configured to receive a first downlink service packet sent by the core network device to the fixed network device.

The processing unit 1102 is further configured to decapsulate the first downlink service packet in a decapsulation manner corresponding to the tunnel, to obtain a second downlink service packet.

The sending unit 1103 is further configured to send the second downlink service packet to the fixed network device.

The processing unit 1102 is configured to remove, in the decapsulation manner corresponding to the tunnel, the packet header corresponding to the tunnel from the first downlink service packet, to obtain the second downlink service packet.

The tunnel is a general packet radio service tunneling protocol-user plane GTP-U tunnel.

In an embodiment, for a detailed process in which the receiving unit 1101, the processing unit 1102, and the sending unit 1103 transmit the downlink service packet of the fixed network device, refer to the operations performed by the AGF in operations 415 to 419 in the embodiment shown in FIG. 2A and FIG. 2B.

In an embodiment of the application, the processing unit encapsulates the first uplink service packet in the encapsulation manner corresponding to the tunnel, to obtain the second uplink service packet. The sending unit sends the second uplink service packet to the core network device through the tunnel. In this way, the uplink service packet of the fixed network device can be sent to a core network device in a 5G core network or a core network later than a 5G core network.

Figure 12:
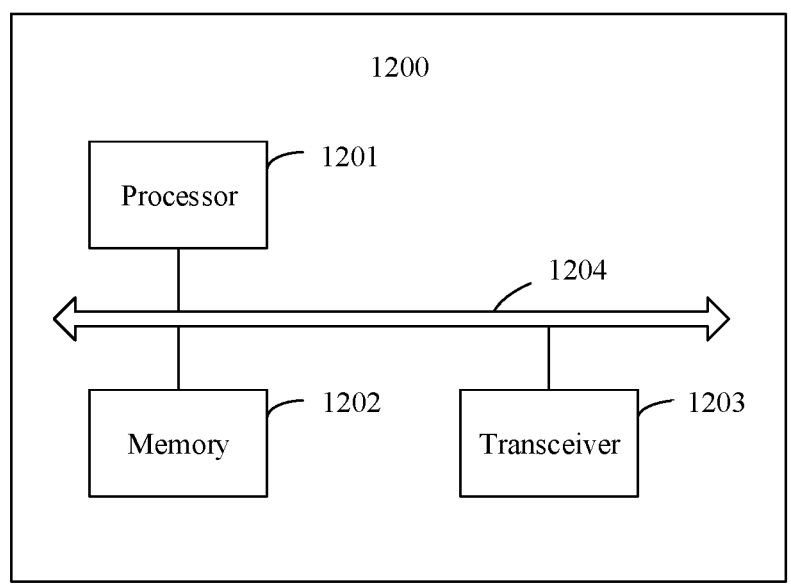
FIG. 12 is a schematic structural diagram of another communications apparatus according to an embodiment of this application.

FIG. 12 is a schematic diagram of a communications apparatus 1200 according to an embodiment of this application. The apparatus 1200 includes a processor 1201, a memory 1202, and a transceiver 1203. The processor 1201 is connected to the memory 1202 and the transceiver 1203.

The communications apparatus 1200 is an apparatus having a hardware structure, and may be configured to implement functional modules in the apparatus shown in FIG. 5. For example, one of ordinary skilled in the art may figure out that the processing unit 502 in the apparatus 500 shown in FIG. 5 may be implemented by the processor 1201 by invoking code in the memory 1202, and the receiving unit 501 and the sending unit 503 in the apparatus 500 shown in FIG. 5 may be implemented by the transceiver 1203.

In an embodiment, the processor 1201 may be one or more central processing units (CPU), a microprocessor, an application-specific integrated circuit (ASIC), or one or more integrated circuits configured to control program execution of the solutions in this application.

The processor 1201 is configured to execute instructions in the memory 1202, to perform the processing operations applied to the BNG in the embodiment shown in FIG. 1, or perform the operations performed by the BNG in the embodiment shown in FIG. 2A and FIG. 2B.

The memory 1202, the processor 1201, and the transceiver 1203 are connected to each other through a bus 1204. The bus 1204 may be a peripheral component interconnect (PCI for short) bus, an extended industry standard architecture (EISA for short) bus, or the like. The bus may be classified into an address bus, a data bus, a control bus, or the like.

In an embodiment, the transceiver 1203 is configured to receive a dial-up packet sent by a fixed network device. For details, refer to the detailed description of operation 201 in the embodiment shown in FIG. 2A and FIG. 2B.

The processor 1201 is configured to generate first authentication information of the fixed network device based on the dial-up packet, where the first authentication information includes an identifier of the fixed network device. For details, refer to the detailed description of operation 202 in the embodiment shown in FIG. 2A and FIG. 2B.

The transceiver 1203 is configured to send an access request message to a fixed mobile interworking function FMIF, where the access request message carries the first authentication information, the access request message is used by the FMIF to request a core network device to perform authentication on the fixed network device based on the first authentication information, and a communications network to which the core network device belongs is a 5G communications network or a communications network later than a 5G communications network. For details, refer to the detailed description of operation 203 in the embodiment shown in FIG. 2A and FIG. 2B.

In another embodiment, the communications apparatus 1200 may further separately perform the operations implemented by the BNG in the embodiment shown in FIG. 2A and FIG. 2B, for example, operation 207, operations 211 to 213, and operation 220. Details are not described herein again.

Figure 13:
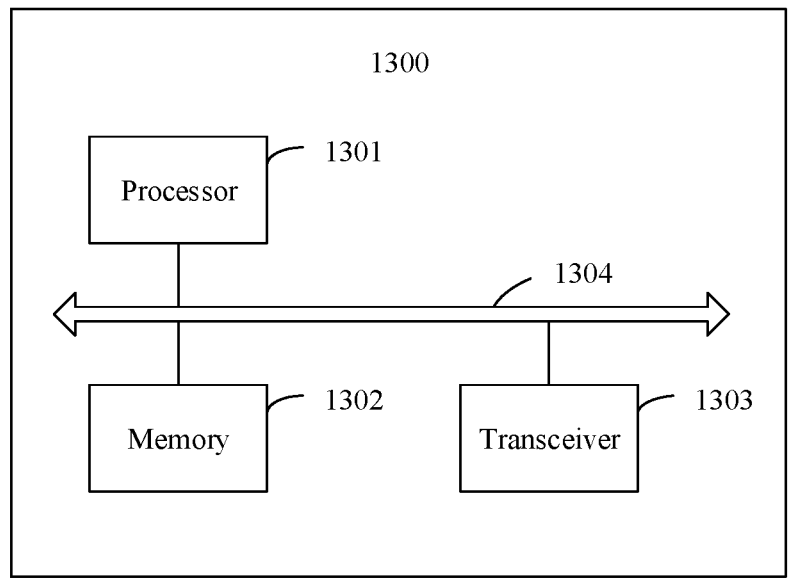
FIG. 13 is a schematic structural diagram of another communications apparatus according to an embodiment of this application.

FIG. 13 is a schematic diagram of a communications apparatus 1300 according to an embodiment of this application. The apparatus 1300 includes a processor 1301, a memory 1302, and a transceiver 1303. The processor 1301 is connected to the memory 1302 and the transceiver 1303.

The communications apparatus 1300 is an apparatus having a hardware structure, and may be configured to implement functional modules in the apparatus shown in FIG. 6 or FIG. 8. For example, one of ordinary skilled in the art may figure out that the processing unit 602 in the apparatus 600 shown in FIG. 6 or the processing unit 802 in the apparatus 800 shown in FIG. 8 may be implemented by the processor 1301 by invoking code in the memory 1302, and the receiving unit 601 and the sending unit 603 in the apparatus 600 shown in FIG. 6 or the receiving unit 801 and the sending unit 803 in the apparatus 800 shown in FIG. 8 may be implemented by the transceiver 1303.

In an embodiment, the processor 1301 may be one or more central processing units (CPU), a microprocessor, an application-specific integrated circuit (ASIC), or one or more integrated circuits configured to control program execution of the solutions in this application.

The processor 1301 is configured to execute instructions in the memory 1302, to perform the processing operations applied to the FMIF in the embodiment shown in FIG. 1, or perform the operations performed by the FMIF in the embodiment shown in FIG. 2A and FIG. 2B.

The memory 1302, the processor 1301, and the transceiver 1303 are connected to each other through a bus 1304. The bus 1304 may be a peripheral component interconnect (, PCI for short) bus, an extended industry standard architecture (EISA for short) bus, or the like. The bus may be classified into an address bus, a data bus, a control bus, or the like.

In an embodiment, the transceiver 1303 is configured to receive an access request message sent by a broadband network gateway BNG, where the access request message includes first authentication information of a fixed network device, the first authentication information is generated by the BNG based on a dial-up packet sent by the fixed network device, and the first authentication information includes an identifier of the fixed network device. For details, refer to the detailed description of operation 203 in the embodiment shown in FIG. 2A and FIG. 2B.

The processor 1301 is configured to encapsulate the first authentication information in a message format supported by a control plane interface, to obtain second authentication information, where the control plane interface is an interface that is in the FMIF and that is used to communicate with a core network device, and a communications network to which the core network device belongs is a 5G communications network or a communications network later than a 5G communications network. For details, refer to the detailed description of operation 204 in the embodiment shown in FIG. 2A and FIG. 2B.

The transceiver 1303 is configured to send the second authentication information to the core network device through the control plane interface, where the second authentication information is used by the core network device to perform authentication on the fixed network device. For details, refer to the detailed description of operation 205 in the embodiment shown in FIG. 2A and FIG. 2B.

In another embodiment, the communications apparatus 1300 may further separately perform the operations implemented by the FMIF in the embodiment shown in FIG. 2, for example, operation 207, operation 208, operation 214, operation 215, operation 219, and operation 220. Details are not described herein again.

Figure 14:
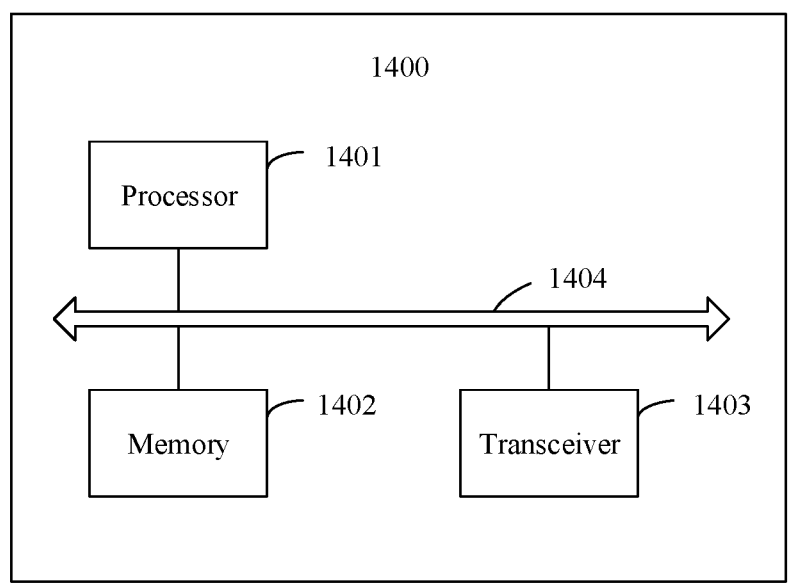
FIG. 14 is a schematic structural diagram of another communications apparatus according to an embodiment of this application.

FIG. 14 is a schematic diagram of a communications apparatus 1400 according to an embodiment of this application. The apparatus 1400 includes a processor 1401, a memory 1402, and a transceiver 1403. The processor 1401 is connected to the memory 1402 and the transceiver 1403.

The apparatus 1400 is an apparatus having a hardware structure, and may be configured to implement functional modules in the apparatus shown in FIG. 7 or FIG. 9. For example, one of ordinary skilled in the art may figure out that the processing unit 702 in the apparatus 700 shown in FIG. 7 or the processing unit 902 in the apparatus 900 shown in FIG. 9 may be implemented by the processor 1401 by invoking code in the memory 1402, and the receiving unit 701 and the sending unit 703 in the apparatus 700 shown in FIG. 7 or the receiving unit 901 and the sending unit 903 in the apparatus 900 shown in FIG. 9 may be implemented by the transceiver 1403.

In an embodiment, the processor 1401 may be one or more central processing units (CPU), a microprocessor, an application-specific integrated circuit (ASIC), or one or more integrated circuits configured to control program execution of the solutions in this application.

The processor 1401 is configured to execute instructions in the memory 1402, to perform the processing operations applied to the core network device in the embodiment shown in FIG. 1, or perform the operations performed by the core network device in the embodiment shown in FIG. 2A and FIG. 2B.

The memory 1402, the processor 1401, and the transceiver 1403 are connected to each other through a bus 1404. The bus 1404 may be a peripheral component interconnect (PCI for short) bus, an extended industry standard architecture (for short) bus, or the like. The bus may be classified into an address bus, a data bus, a control bus, or the like.

In an embodiment, the transceiver 1403 is configured to receive a session establishment request message from a fixed mobile interworking function FMIF, where the session establishment request message includes an identifier of a fixed network device, and a communications network to which the core network device belongs is a 5G communications network or a communications network later than a 5G communications network. For details, refer to the detailed description of operation 205 in the embodiment shown in FIG. 2A and FIG. 2B.

The processor 1401 is configured to allocate session information to the fixed network device based on the identifier of the fixed network device, where the session information includes an address of the fixed network device, a tunnel endpoint identifier TEID of a tunnel on the side of the core network device, and a tunnel parameter of the tunnel, and the tunnel is a tunnel that is between the FMIF and the core network device and that corresponds to the fixed network device. For details, refer to the detailed description of operation 206 in the embodiment shown in FIG. 2A and FIG. 2B.

The transceiver 1403 is configured to send the session information to the FMIF, where the session information is used by the FMIF to establish a data plane connection between the fixed network device and the core network device. For details, refer to the detailed description of operation 206 in the embodiment shown in FIG. 2A and FIG. 2B.

In another embodiment, the communications apparatus 1400 may further separately perform the operations implemented by the core network device in the embodiment shown in FIG. 2A and FIG. 2B, for example, operation 209, operation 210, and operations 216 to 218. Details are not described herein again.

Figure 15:
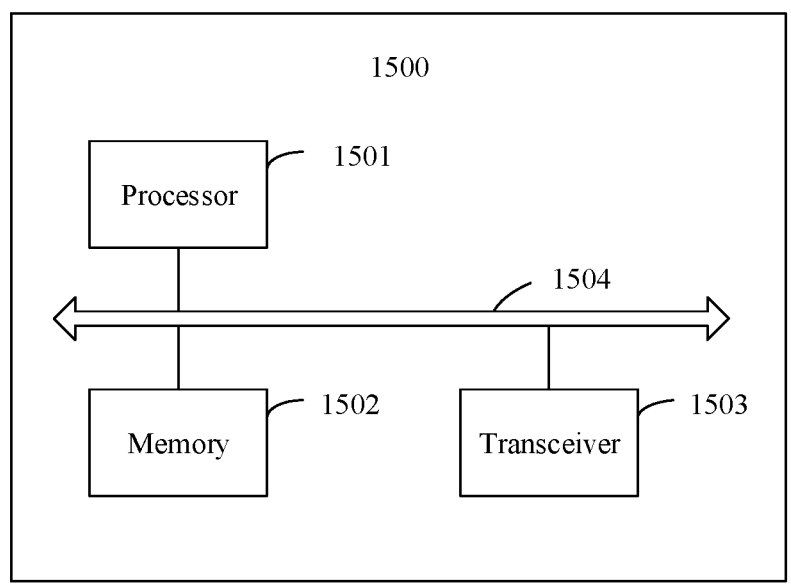
FIG. 15 is a schematic structural diagram of another communications apparatus according to an embodiment of this application.

FIG. 15 is a schematic diagram of a communications apparatus 1500 according to an embodiment of this application. The apparatus 1500 includes a processor 1501, a memory 1502, and a transceiver 1503. The processor 1501 is connected to the memory 1502 and the transceiver 1503.

The communications apparatus 1500 is an apparatus having a hardware structure, and may be configured to implement functional modules in the apparatus shown in FIG. 10 or FIG. 11. For example, one of ordinary skilled in the art may figure out that the processing unit 1002 in the apparatus 1000 shown in FIG. 10 or the processing unit 1102 in the apparatus 1100 shown in FIG. 11 may be implemented by the processor 1501 by invoking code in the memory 1502, and the receiving unit 1001 and the sending unit 1003 in the apparatus 1000 shown in FIG. 10 or the receiving unit 1101 and the sending unit 1103 in the apparatus 1100 shown in FIG. 11 may be implemented by the transceiver 1503.

In an embodiment, the processor 1501 may be one or more central processing units (CPU), a microprocessor, an application-specific integrated circuit (ASIC), or one or more integrated circuits configured to control program execution of the solutions in this application.

The processor 1501 is configured to execute instructions in the memory 1502, to perform the processing operations applied to the AGF in the embodiment shown in FIG. 3, or perform the operations performed by the AGF in the embodiment shown in FIG. 4A and FIG. 4B.

The memory 1502, the processor 1501, and the transceiver 1503 are connected to each other through a bus 1504. The bus 1504 may be a peripheral component interconnect (PCI for short) bus, an extended industry standard architecture (EISA for short) bus, or the like. The bus may be classified into an address bus, a data bus, a control bus, or the like.

In an embodiment, the transceiver 1503 is configured to receive a dial-up packet sent by a fixed network device. For details, refer to the detailed description of operation 401 in the embodiment shown in FIG. 4A and FIG. 4B.

The processor 1501 is configured to: generate first authentication information of the fixed network device based on the dial-up packet, where the first authentication information includes an identifier of the fixed network device; and encapsulate the first authentication information, to obtain second authentication information. For details, refer to the detailed description of operation 402 and operation 403 in the embodiment shown in FIG. 4A and FIG. 4B.

The transceiver 1503 is configured to send the second authentication information to a core network device, where the second authentication information is used by the core network device to perform authentication on the fixed network device, and a communications network to which the core network device belongs is a 5G communications network or a communications network later than a 5G communications network. For details, refer to the detailed description of operation 404 in the embodiment shown in FIG. 4A and FIG. 4B.

In another embodiment, the communications apparatus 1500 may further separately perform the operations implemented by the AGF in the embodiment shown in FIG. 4A and FIG. 4B, for example, operations 405 to 407, operations 409 to 413, and operations 416 to 418. Details are not described herein again.

One of ordinary skill in the art may understand that all or a part of the operations in the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A communication method, comprising:
receiving, by a broadband network gateway (BNG), a dial-up packet sent by a fixed network device;
generating, by the BNG, first authentication information of the fixed network device based on the dial-up packet, wherein the first authentication information comprises an identifier of the fixed network device; and
sending, by the BNG, an access request message to a fixed mobile interworking function (FMIF), wherein the access request message carries the first authentication information, wherein the access request message is used by the FMIF to request a core network device to perform authentication on the fixed network device including a fixed network residential gateway based on the first authentication information, and wherein a communications network to which the core network device belongs is a 5G communications network or a communications network later than a 5G communications network.

2. The method according to claim 1, wherein the access request message is a remote authentication dial-in user service Radius protocol access request message or a Diameter protocol access request message.

3. The method according to claim 1, wherein after the sending the access request message to the FMIF, the method further comprises:
receiving, by the BNG, an address of the fixed network device that is sent by the core network device through the FMIF, wherein the address of the fixed network device is assigned by the core network device after the core network device receives a session establishment request message carrying the identifier of the fixed network device, and wherein the session establishment request message is sent by the FMIF after the authentication performed by the core network device on the fixed network device succeeds; and
establishing, by the BNG based on the address of the fixed network device and an address of the FMIF, a data plane connection between the BNG and the FMIF corresponding to the fixed network device.

4. A communication method, further comprising:
receiving, by a fixed mobile interworking function (FMIF), an access request message sent by a broadband network gateway (BNG), wherein the access request message comprises first authentication information of a fixed network device, wherein the first authentication information is generated by the BNG based on a dial-up packet sent by the fixed network device, and wherein the first authentication information comprises an identifier of the fixed network device;
encapsulating, by the FMIF, the first authentication information in a message format supported by a control plane interface, to obtain second authentication information, wherein the control plane interface is an interface that is in the FMIF and that is used to communicate with a core network device, and wherein a communications network to which the core network device belongs is a 5G communications network or a communications network later than a 5G communications network; and
sending, by the FMIF, the second authentication information to the core network device through the control plane interface, wherein the second authentication information is used by the core network device to perform authentication on the fixed network device including a fixed network residential gateway.

5. The method according to claim 4, wherein the control plane interface comprises an N1 interface or an N2 interface, and wherein the second authentication information is a subscription concealed identifier (SUCI), a subscription permanent identifier (SUPI), or a 5G globally unique temporary identity (5G-GUTI).

6. The method according to claim 4, further comprising:
receiving, by the FMIF, an acknowledgment message sent by the core network device after the authentication succeeds;
sending, by the FMIF, a session establishment request message to the core network device, wherein the session establishment request message carries the identifier of the fixed network device, wherein the session establishment request message is used by the core network device to allocate session information, wherein the session information comprises an address of the fixed network device, a tunnel endpoint identifier (TEID) of a tunnel on the side of the core network device, and a tunnel parameter of the tunnel, and wherein the tunnel is a tunnel between the FMIF and the core network device corresponding to the fixed network device;
receiving, by the FMIF, the session information sent by the core network device; and
establishing, by the FMIF based on the session information, a data plane connection between the FMIF and the BNG corresponding to the fixed network device, and establishing the tunnel based on the session information.

7. The method according to claim 6, wherein the establishing the data plane connection between the FMIF and the BNG corresponding to the fixed network device, and establishing the tunnel based on the session information comprises:
sending, by the FMIF, the address of the fixed network device to the BNG, and storing a correspondence between the address of the fixed network device and an address of the BNG into a first relationship table, wherein the first relationship table is used by the FMIF to transmit a downlink service packet of the fixed network device; and
storing, by the FMIF, a correspondence between the address of the fixed network device, a TEID of the tunnel on the side of the FMIF, and the TEID of the tunnel on the side of the core network device into a second relationship table, wherein the second relationship table is used by the FMIF to send an uplink service packet of the fixed network device.

8. The method according to claim 6, wherein the session information further comprises the TEID of the tunnel on the side of the FMIF.

9. The method according to claim 7, wherein before the storing the correspondence between the address of the fixed network device, the TEID of the tunnel on the side of the FMIF, and the TEID of the tunnel on the side of the core network device into the second relationship table, the method further comprises:
allocating, by the FMIF, the TEID of the tunnel on the side of the FMIF, and sending the TEID of the tunnel on the side of the FMIF to the core network device, wherein the TEID of the tunnel on the side of the FMIF is stored by the core network device into a correspondence table, wherein the correspondence table comprises the correspondence between the address of the fixed network device, the TEID of the tunnel on the side of the FMIF, and the TEID of the tunnel on the side of the core network device, and wherein the correspondence table is used by the core network device to transmit the downlink service packet of the fixed network device.

10. The method according to claim 6, wherein the sending the session establishment request message to the core network device comprises:
sending, by the FMIF, the session establishment request message to the core network device through the control plane interface, wherein the control plane interface comprises the N1 interface or the N2 interface.

11. A communication method, comprising:
receiving, by a core network device, a session establishment request message from a fixed mobile interworking function (FMIF), wherein the session establishment request message comprises an identifier of a fixed network device including a fixed network residential gateway, and wherein a communications network to which the core network device belongs is a 5G communications network or a communications network later than a 5G communications network;
allocating, by the core network device, session information to the fixed network device based on the identifier of the fixed network device, wherein the session information comprises an address of the fixed network device, a tunnel endpoint identifier (TEID) of a tunnel on the side of the core network device, and a tunnel parameter of the tunnel, and wherein the tunnel is a tunnel between the FMIF and the core network device corresponding to the fixed network device; and
sending, by the core network device, the session information to the FMIF, wherein the session information is used by the FMIF to establish a data plane connection between the fixed network device and the core network device.

12. The method according to claim 11, wherein before the receiving the session establishment request message from the FMIF, the method further comprises:
receiving, by the core network device, second authentication information sent by the FMIF, wherein the second authentication information is obtained by the FMIF by encapsulating first authentication information in a message format supported by a control plane interface, wherein the control plane interface is an interface that is in the FMIF and that is used to communicate with the core network device, and wherein the first authentication information comprises the identifier of the fixed network device; and
performing, by the core network device, authentication on the fixed network device based on the second authentication information.

13. The method according to claim 11, wherein the session information further comprises a TEID of the tunnel on the side of the FMIF.

14. The method according to claim 11, further comprising:
receiving, by the core network device, a TEID of the tunnel on the side of the FMIF sent by the FMIF, wherein the TEID of the tunnel on the side of the FMIF is sent by using the session establishment request message, or is sent after the FMIF receives the session information.

15. The method according to claim 11, wherein after the sending the session information to the FMIF, the method further comprises:
storing, by the core network device, a correspondence between the address of the fixed network device, the TEID of the tunnel on the side of the FMIF, and the TEID of the tunnel on the side of the core network device into a correspondence table used by the core network device to transmit a downlink service packet of the fixed network device.

16. A communications apparatus, comprising:
a processor, and
a memory, coupled to the processor to store instructions, which when executed by the processor, cause the processor to perform operations, the operations comprising:
receiving a dial-up packet sent by a fixed network device;
generating first authentication information of the fixed network device based on the dial-up packet, wherein the first authentication information comprises an identifier of the fixed network device; and
sending an access request message to a fixed mobile interworking function (FMIF), wherein the access request message carries the first authentication information, wherein the access request message is used by the FMIF to request a core network device to perform authentication on the fixed network device including a fixed network residential gateway based on the first authentication information, and wherein a communications network to which the core network device belongs is a 5G communications network or a communications network later than a 5G communications network.

17. A communications apparatus, comprising:
a processor, and
a memory coupled to the processor to store instructions, which when executed by the processor, cause the processor to perform operations, the operations comprising:
receiving an access request message sent by a broadband network gateway BNG, wherein the access request message comprises first authentication information of a fixed network device, the first authentication information is generated by the BNG based on a dial-up packet sent by the fixed network device, and the first authentication information comprises an identifier of the fixed network device;
encapsulating the first authentication information in a message format supported by a control plane interface, to obtain second authentication information, wherein the control plane interface is an interface that is in a fixed mobile interworking function (FMIF) and that is used to communicate with a core network device, and wherein a communications network to which the core network device belongs is a 5G communications network or a communications network later than a 5G communications network; and
sending the second authentication information to the core network device through the control plane interface, wherein the second authentication information is used by the core network device to perform authentication on the fixed network device including a fixed network residential gateway.

18. A communications apparatus, comprising:
a processor, and a memory coupled to the processor to store instructions, which when executed by the processor, cause the processor to perform operations, the operations comprising:

receiving a session establishment request message from a fixed mobile interworking function (FMIF), wherein the session establishment request message comprises an identifier of a fixed network device including a fixed network residential gateway, and wherein a communications network to which a core network device belongs is a 5G communications network or a communications network later than a 5G communications network;

allocating session information to the fixed network device based on the identifier of the fixed network device, wherein the session information comprises an address of the fixed network device, a tunnel endpoint identifier (TEID) of a tunnel on the side of the core network device, and a tunnel parameter of the tunnel, and wherein the tunnel is a tunnel between the FMIF and the core network device corresponding to the fixed network device; and sending the session information to the FMIF, wherein the session information is used by the FMIF to establish a data plane connection between the fixed network device and the core network device.

19. The communications apparatus of claim 18, wherein before the receiving the session establishment request message from the FMIF, the operations further comprise:

receiving, by the core network device, second authentication information sent by the FMIF, wherein the second authentication information is obtained by the FMIF by encapsulating first authentication information in a message format supported by a control plane interface, wherein the control plane interface is an interface that is in the FMIF and that is used to communicate with the core network device, and wherein the first authentication information comprises the identifier of the fixed network device; and performing, by the core network device, authentication on the fixed network device based on the second authentication information.

20. The communications apparatus of claim 18, wherein the session information further comprises a TEID of the tunnel on the side of the FMIF.

* * * * *